US011920377B2

(12) United States Patent
Taniuchi et al.

(10) Patent No.: US 11,920,377 B2
(45) Date of Patent: Mar. 5, 2024

(54) LOCKING/UNLOCKING DEVICE, LOCKING/UNLOCKING METHOD, AND LOCKING/UNLOCKING SYSTEM

(71) Applicant: Sony Corporation, Tokyo (JP)

(72) Inventors: Hirotada Taniuchi, Tokyo (JP); Tatsuhiro Iida, Tokyo (JP); Manabu Onishi, Tokyo (JP); Tatsuya Narahara, Tokyo (JP); Hiroshige Okamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 636 days.

(21) Appl. No.: 17/253,618

(22) PCT Filed: Jun. 29, 2018

(86) PCT No.: PCT/JP2018/024774
§ 371 (c)(1),
(2) Date: Dec. 18, 2020

(87) PCT Pub. No.: WO2020/003487
PCT Pub. Date: Jan. 2, 2020

(65) Prior Publication Data
US 2021/0262251 A1 Aug. 26, 2021

(51) Int. Cl.
*E05B 47/02* (2006.01)
*E05B 17/22* (2006.01)
*E05B 47/00* (2006.01)

(52) U.S. Cl.
CPC .............. *E05B 47/02* (2013.01); *E05B 17/22* (2013.01); *E05B 47/0002* (2013.01);
(Continued)

(58) Field of Classification Search
CPC ..... E05B 2047/0067; E05B 2047/0068; E05B 2047/0069; E05B 2047/005;
(Continued)

(56) References Cited

U.S. PATENT DOCUMENTS

2017/0193724 A1 7/2017 Johnson

FOREIGN PATENT DOCUMENTS

DE 112009000459 T5 2/2011
DE 202010010852 U1 11/2011
(Continued)

OTHER PUBLICATIONS

International Search Report and Written Opinion dated Oct. 2, 2018, received for PCT Application No. PCT/JP2018/024774, Filed on Jun. 29, 2018, 11 pages including English Translation.

*Primary Examiner* — Christine M Mills
*Assistant Examiner* — Yahya Sidky
(74) *Attorney, Agent, or Firm* — XSENSUS LLP

(57) ABSTRACT

Provided is a locking/unlocking device that accurately detects an opening/closing state of an opening/closing device and optimizes timing to lock or unlock.
The locking/unlocking device includes a drive unit that drives a lock mechanism of the opening/closing device, a magnetic detection unit that detects a change in a magnetic field based on a change in the relative position between a movable section and a fixed section of the opening/closing device, and a control unit that determines an open/closed state of the opening/closing device on the basis of the change in the magnetic field detected by the magnetic detection unit and activates the drive unit to lock or unlock the lock mechanism on the basis of the open/closed state.

16 Claims, 19 Drawing Sheets

(52) U.S. Cl.
CPC . *E05B 2047/005* (2013.01); *E05B 2047/0067* (2013.01); *E05B 2047/0081* (2013.01)

(58) Field of Classification Search
CPC ..... E05B 2047/0051; E05B 2047/0081; E05B 47/02; E05B 47/0002; E05B 17/22
See application file for complete search history.

(56) References Cited

FOREIGN PATENT DOCUMENTS

| | | | | |
|---|---|---|---|---|
| JP | 2010229679 | | * | 1/2010 |
| JP | 2010-203190 | A | | 9/2010 |
| JP | 2010203190 | | * | 9/2010 |
| JP | 2010-229679 | A | | 10/2010 |
| JP | 2012-154065 | A | | 8/2012 |
| JP | 2015-148998 | A | | 8/2015 |
| JP | 2015148998 | | * | 8/2015 |
| JP | 2016-223212 | A | | 12/2016 |
| JP | 2016-223277 | A | | 12/2016 |
| JP | 2017110431 | A | | 6/2017 |
| JP | 2017-210856 | A | | 11/2017 |
| JP | 2017210856 | | * | 11/2017 |
| JP | 2018090991 | | * | 6/2018 |
| WO | 2013/077100 | A1 | | 5/2013 |
| WO | WO-2014154738 | A1 | | 10/2014 |
| WO | WO-2017046399 | A1 | | 3/2017 |
| WO | WO-2018055398 | A1 | | 3/2018 |

* cited by examiner

LOCKING/UNLOCKING DEVICE, LOCKING/UNLOCKING METHOD, AND LOCKING/UNLOCKING SYSTEM

CROSS-REFERENCE TO RELATED APPLICATION

The present application is based on PCT filing PCT/JP2018/024774, filed Jun. 29, 2018, the entire contents of which are incorporated herein by reference.

FIELD

The present disclosure relates to a locking/unlocking device, a locking/unlocking method, and a locking/unlocking system.

BACKGROUND

Conventionally, an unlocking device has been developed that automatically unlocks a door when a user terminal approaches the door. For example, Patent Literature 1 discloses a technique of detecting an approach of a user to a door and automatically unlocking the door.

CITATION LIST

Patent Literature

Patent Literature 1: Japanese Laid-open Patent Publication No. 2016-223212

SUMMARY

Technical Problem

However, the technique described in Patent Literature 1 does not determine the open/closed state of the door, and it is difficult to accurately detect the open/closed state of the door and optimize the locking/unlocking timing.

Therefore, it has been required to provide a locking/unlocking device that accurately detects the opening/closing of the door and optimizes the locking/unlocking timing.

Solution to Problem

According to the application concerned, a locking/unlocking device is provided that includes: a drive unit configured to drive a lock mechanism of an opening/closing device; a magnetic detection unit configured to detect a change in a magnetic field based on a change in a relative position between a movable section and a fixed section of the opening/closing device; and a control unit configured to determine an open/closed state of the opening/closing device on a basis of the change in the magnetic field detected by the magnetic detection unit and activate the drive unit to lock or unlock the lock mechanism on a basis of the open/closed state.

Moreover, according to the application concerned, a locking/unlocking method is provided that includes: determining an open/closed state of an opening/closing device on a basis of a change in a magnetic field based on a change in the relative position between a movable section and a fixed section of the opening/closing device, which is detected by a magnetic detection unit; and activating a drive unit on a basis of the open/closed state of the opening/closing device to drive a lock mechanism of the opening/closing device.

Moreover, according to the application concerned, a locking/unlocking system is provided that includes: a drive unit configured to drive a lock mechanism of an opening/closing device; a magnetic detection unit configured to detect a change in a magnetic field based on a change in a relative position between a movable section and a fixed section of the opening/closing device; a control unit configured to determine an open/closed state of the opening/closing device on a basis of the change in the magnetic field detected by the magnetic detection unit and activate the drive unit on a basis of the open/closed state of the opening/closing device to lock or unlock the lock mechanism; a locking/unlocking device including a communication unit; and a communication terminal, wherein the locking/unlocking device activates the magnetic detection unit when the communication unit receives a signal from the communication terminal.

According to the application concerned, a magnetic detection unit detects a change in a magnetic field based on a change in a relative position between a movable section and a fixed section of an opening/closing device. A control unit determines an open/closed state on the basis of the change in the magnetic field and determines whether to perform a locking/unlocking operation on the basis of the open/closed state. According to the determination result, the control unit activates a drive unit to lock or unlock a lock mechanism.

Advantageous Effects of Invention

As described above, according to the present disclosure, there is provided a locking/unlocking device that can determine the opened/closed state of the opening/closing device and realize an appropriate locking/unlocking operation.

Note that the above effects are not necessarily limited, and any of the effects described in the present specification or other effects that can be grasped from the present specification are exhibited together with or in place of the above effects.

DESCRIPTION OF EMBODIMENTS

Figure 1:
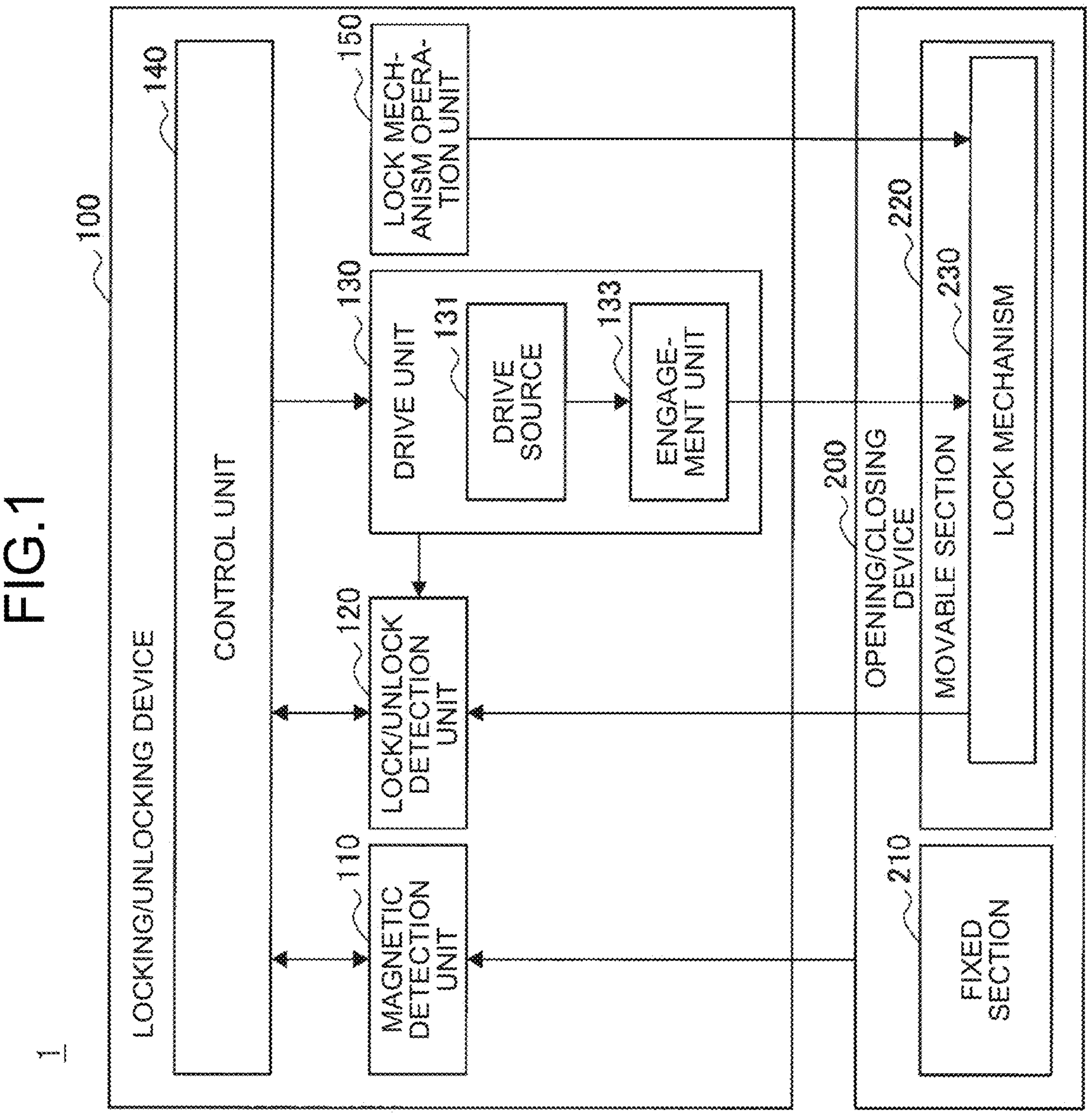
FIG. 1 is a block diagram illustrating an example of a configuration of a locking/unlocking device according to a first embodiment of the present disclosure.

Hereinafter, preferred embodiments of the present disclosure will be described in detail with reference to the accompanying drawings. In the present specification and the drawings, constituent elements having substantially the same functional configuration are designated by the same reference numerals, and a duplicate description will be omitted.

The description will be given in the following order.

1. First embodiment (Locking/unlocking device for detecting change in magnetic field)
1.1. Overall configuration of locking/unlocking device system
1.2. Description of each part of locking/unlocking device
1.3. Description of control
2. Second embodiment (Changing output cycle)
3. Third embodiment (Automatic lock stop function)
4. Fourth embodiment (Unlocking from communication terminal)
4.1. Overall structure of the locking/unlocking device
4.2. Explanation of control
5. Fifth embodiment (Unlocking by beacon transmission)
6. Sixth embodiment (Fixed section permanent magnet)

1. First Embodiment

1.1. Overall Configuration of Locking/Unlocking Device System 1

With reference to FIG. 1, a schematic configuration of a locking/unlocking device system 1 according to a first embodiment of the present disclosure will be described. As illustrated in FIG. 1, the locking/unlocking device system 1 according to the present embodiment includes a locking/unlocking device 100 and an opening/closing device 200.

The opening/closing device 200 includes a fixed section 210 and a movable section 220. Further, the movable section 220 includes a lock mechanism 230. The movable section 220 is configured to be movable with respect to the fixed section 210. The opening/closing device 200 can secure communication between a partitioned area and another area by moving the movable section 220 with respect to the fixed section 210. At least a part of either or both of the fixed section 210 and the movable section 220 may be made of a magnetic material. Examples of the opening/closing device 200 are a door and a window. Examples of the fixed section 210 are a door frame and a window frame. Examples of the movable section 220 are a door main body and a window main body. Note that the lock mechanism 230 may be provided in the fixed section 210. Further, the opening/closing device 200 may include a handle portion 250.

The locking/unlocking device 100 is attached to the opening/closing device 200 and operates the lock mechanism 230 of the opening/closing device 200. An example of the lock mechanism 230 of the opening/closing device 200 is a cylinder lock having a thumb turn. As an example of how to attach the locking/unlocking device 100, the locking/unlocking device 100 may be attached so as to cover the lock mechanism 230 from outside of the lock mechanism 230. The locking/unlocking device 100 may be detachably attached to the opening/closing device 200. The term "detachable" includes a case where the device is attached by an adhesive tape or a mechanical lock in a manner that the device can be easily detached, and also includes a mode in which a tool or the like is needed to detach the device. The locking/unlocking device 100 may be attached to either the fixed section 210 or the movable section 220 of the opening/closing device 200.

1.2. Description of Each Part of Locking/Unlocking Device 100

The locking/unlocking device 100 includes a magnetic detection unit 110, a lock/unlock detection unit 120, a drive unit 130, and a control unit 140. Further, the locking/unlocking device 100 may include a lock mechanism operation unit 150 for operating the lock mechanism 230 of the opening/closing device 200.

The magnetic detection unit 110 detects a change in a magnetic field (a magnetizing field) caused by opening and closing the opening/closing device 200. For example, when the fixed section 210 is made of a magnetic material, the relative positional relationship, such as the angle and the distance, between the fixed section 210 and the movable section 220 changes as the opening/closing device 200 is opened and closed. The magnetic detection unit 110 detects a change in the magnetic field that changes according to the relative positional relationship between the fixed section 210 and the movable section 220 of the opening/closing device 200. The strength of the magnetic field changes greatly depending on the distance from the magnetic material. In other words, the strength of the magnetic field attenuates in inverse proportion to the square of the distance from the magnetic material. Therefore, the magnetic field around the magnetic detection unit 110 changes as the relative positional relationship between the fixed section 210 and the movable section 220 changes. An example of the magnetic detection unit 110 is a triaxial magnetic sensor. Examples of the triaxial magnetic sensor are a Hall sensor, a magnetro resistance (MR) sensor, and a magnetro Impedance (MI) sensor.

Figure 2:
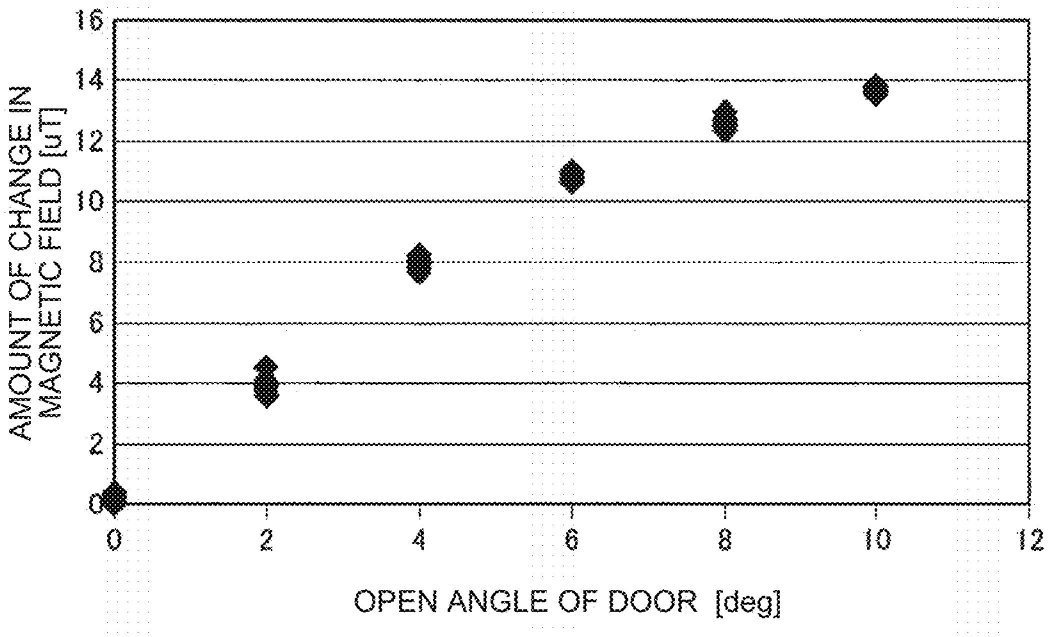
FIG. 2 is a diagram illustrating a relationship between an opening angle of a door, which is an example of the opening/closing device according to the same embodiment, and a change amount of a magnetic field.

Here, the detection accuracy of the magnetic detection unit 110 according to the present embodiment will be described with reference to FIG. 2. As described above, when the fixed section 210 is made of a magnetic material such as iron, the magnetic field around the movable section 220 changes according to an open angle of the door, which is an example of the movable section 220. An amount of the change in the magnetic field changes according to the open angle of the movable section 220. For example, it can be seen from FIG. 2 that when the movable section 220 is opened by 2°, the change amount of the magnetic field indicates a value of about 4 uT, and when the movable section 220 is opened by 4°, the change amount of the magnetic field indicates a value of about 8 uT.

The magnetic detection unit 110 according to the present embodiment can detect the change in the relative position between the fixed section 210 and the movable section 220, that is, the opening/closing of the opening/closing device 200 with high accuracy, by detecting such a change in the magnetic field. In other words, in the magnetic detection unit 110 according to the present embodiment, even when the open angle of the movable section 220 is a slight angle of 10° or less, a large change in the magnetic field due to the change of the relative position between the fixed section 210 and the movable section 220 can be detected. Therefore, the opening/closing of the opening/closing device 200 can be detected with high accuracy. On the other hand, the conventional magnetic sensor can detect the opening/closing of the opening/closing device 200 when the opening/closing angle of the door changes by 10° or more, and cannot perform highly accurate detection like the magnetic detection unit 110 according to the present disclosure.

Specifically, the detection accuracy of the magnetic detection unit 110 according to the present embodiment may have high sensitivity of 0.5 uT/LSB or less. Furthermore, the detection accuracy of the magnetic detection unit 110 according to the present embodiment may be 0.15 uT/LSB or less. As described above, with the high-sensitivity magnetic detection unit 110, a small change in the peripheral magnetic field caused by opening/closing of the opening/closing device 200 can be detected. Further, there is no need to increase the magnetic force of a magnetic section 190 described later or to bring the magnetic section 190 described later close to the magnetic detection unit 110, and it is possible to provide the locking/unlocking device 100 that is small, lightweight and inexpensive.

The lock/unlock detection unit 120 detects whether the lock mechanism 230 of the opening/closing device 200 is being locked or unlocked. The lock/unlock detection unit 120 may be configured by, for example, a switch that is pressed as the lock mechanism 230 moves. In this case, whether the lock mechanism 230 is in the locked state or the unlocked state can be detected according to the on/off state of the switch. Further, in a case where the lock mechanism 230 has a thumb turn, the lock/unlock detection unit 120 may be configured by a mechanism (sensor) that detects a rotation angle of the thumb turn. In this case, based on the detection result of the lock/unlock detection unit 120, whether the lock mechanism 230 is in the locked state or the unlocked state can be detected. In addition, a proximity sensor may be used as an example of the lock/unlock detection unit 120.

The drive unit 130 drives the lock mechanism 230 of the opening/closing device 200. Examples of the drive unit 130 may include a motor as a drive source 131, a drive shaft that transmits a rotational force of the motor, a gear that adjusts the rotational force of the motor, and an engagement unit 133 that engages with the lock mechanism 230. When the lock mechanism 230 has a thumb turn, the engagement unit 133 is, for example, a thumb turn holder that holds the thumb turn. Furthermore, the drive source 131 may be, for example, an actuator or the like.

The control unit 140 determines the open/closed state of the opening/closing device 200 on the basis of the change in the magnetic field detected by the magnetic detection unit 110. Furthermore, the control unit 140 determines whether to activate the drive unit 130 on the basis of the open/close state of the opening/closing device 200. Further, by activating the drive unit 130, the control unit 140 brings the lock mechanism 230 into a locked state or an unlocked state. An example of the control unit 140 includes a configuration including a central processing unit (CPU), a random access memory (RAM), and a read only memory (ROM). Further, the control unit 140 may determine whether to start or stop the magnetic detection unit 110 on the basis of the detection result from the lock/unlock detection unit 120.

The lock mechanism operation unit 150 enables a user to directly operate the lock mechanism 230 of the opening/closing device 200. For example, when the lock mechanism 230 has a thumb turn, the lock mechanism operation unit 150 may be a knob provided on the thumb turn holder and used to rotatably operate the thumb turn holder.

Figure 3A:
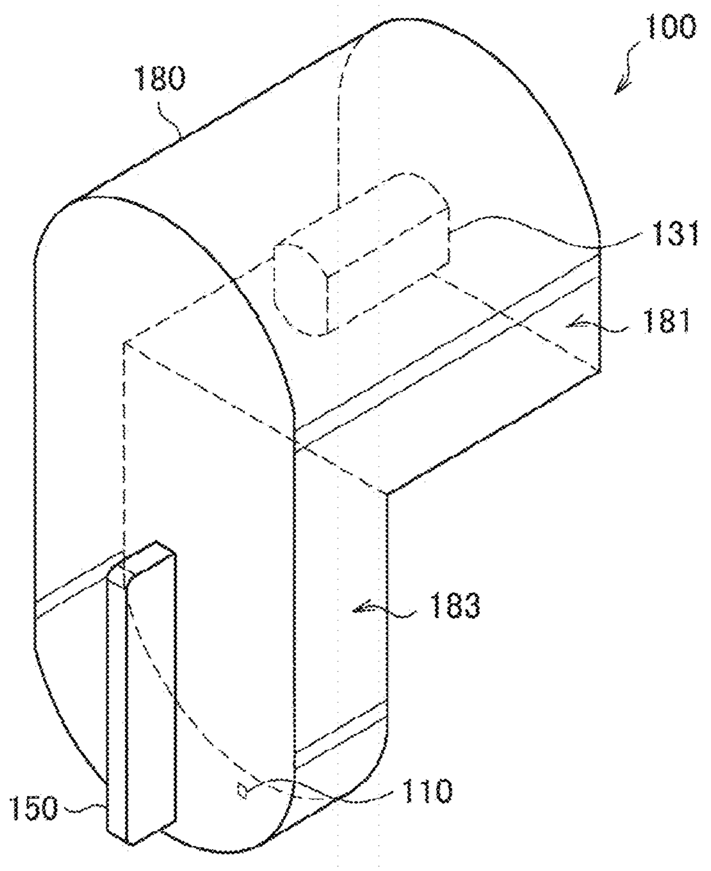
FIG. 3A is a perspective view of an outer appearance of the locking/unlocking device according to the same embodiment.
Figure 3B:
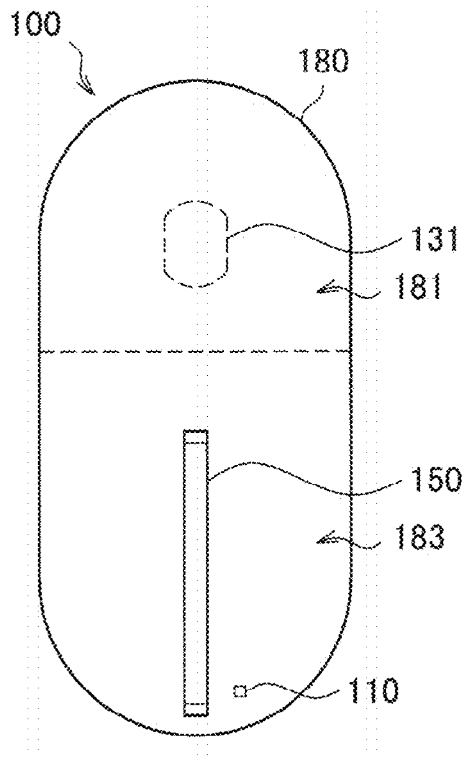
FIG. 3B is a front view of the outer appearance of the locking/unlocking device according to the same embodiment.
Figure 3C:
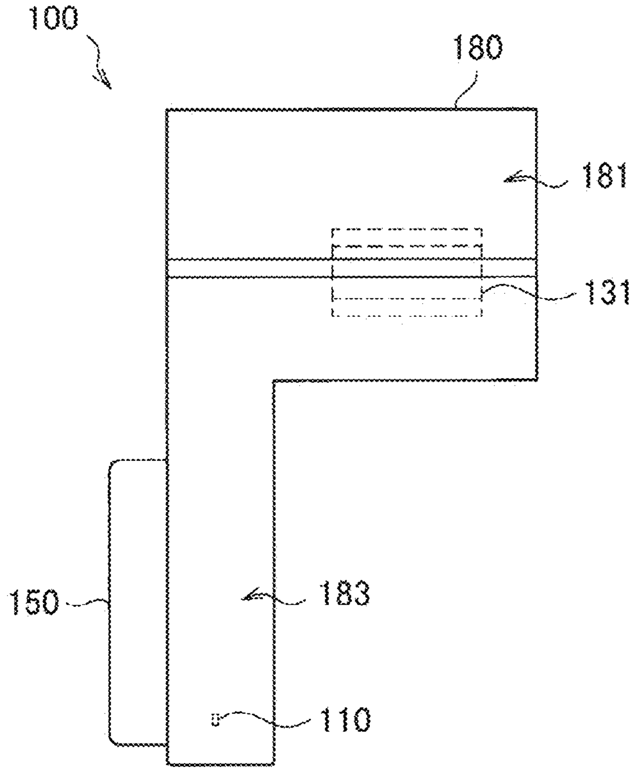
FIG. 3C is a side view of the outer appearance of the locking/unlocking device according to the same embodiment.

The above described locking/unlocking device 100 can be configured as a mechanism as illustrated in FIGS. 3A to 3C, for example. A configuration example of the locking/unlocking device 100 according to the present embodiment will be described with reference to FIGS. 3A to 3C.

As illustrated in FIG. 3A, the locking/unlocking device 100 according to the present embodiment includes a housing unit 180, the housing unit 180 houses the magnetic detection unit 110, the lock/unlock detection unit 120, the drive unit 130, and the control unit 140. As an example of the shape of the housing unit 180, it has an oval shape in a front view as illustrated in FIG. 3B and an L-shape in a side view as illustrated in FIG. 3C. The housing unit 180 has a first portion 181 and a second portion 183. The first portion 181 extends in a vertical direction with respect to a surface of the opening/closing device 200 to which the locking/unlocking device 100 is attached (hereinafter also referred to as "locking/unlocking device attached face". The surface corresponds to the "locking/unlocking device attached surface 240" of FIG. 4A.). The second portion 183 is bent from an end of the first portion 181, and extends in a direction parallel to the locking/unlocking device attached face.

The drive source 131 is housed in the first portion 181. The lock mechanism operation unit 150 is provided in the second portion 183. The user can directly operate the lock mechanism 230 of the opening/closing device 200 by operating the lock mechanism operation unit 150. Further, since the second portion 183 is separated from the locking/unlocking device mounting surface, a space is created between the second portion 183 and the locking/unlocking device attached face. Therefore, the lock mechanism 230 can be positioned in that space.

The magnetic detection unit 110 is provided in the second portion 183 in the locking/unlocking device 100 according to the present embodiment. In particular, the magnetic detection unit 110 is preferably provided in the second portion 183 at a position as far away from the first portion 181 as possible, for example, at the end portion side opposite to the first portion 181. Further, the magnetic detection unit 110 may be provided in the second portion 183 on the outer peripheral side portion of the elliptical arc portion of the housing unit 180.

Further, in a case where the lock mechanism operation unit 150 is a type that knob is used to rotate the lock mechanism 230, the magnetic detection unit 110 may be provided on the side opposite to the drive source 131 with respect to the rotation center axis of the lock mechanism operation unit 150. In other words, when the lock mechanism 230 has a thumb turn and the engagement unit 133 is a thumb turn holder, the magnetic detection unit 110 may be provided on a side opposite to the drive source 131 with respect to a rotation center axis of the thumb turn holder.

By providing the magnetic detection unit 110 at such a position, the distance between the drive source 131 and the magnetic detection unit 110 can be sufficiently separated, and the influence on the magnetic detection unit 110 such as vibration and noise due to magnetism can be reduced. Since many magnetic materials are used in the motor that can be used as the drive source 131, by separating the distance between the drive source 131 and the magnetic detection unit 110 sufficiently, the influence of the magnetic material on the magnetic detection unit 110 can be reduced.

In the locking/unlocking device 100 according to the present embodiment, a non-magnetic material may be used for various components such as the housing unit 180 and screws for configuring the locking/unlocking device 100. In addition, a non-magnetic material may be used for each part of the movable parts such as the lock mechanism operation unit 150 and the engagement unit 133. As a result, the influence of magnetism on the magnetic detection unit 110 due to the components other than the magnetic detection unit 110 included in the locking/unlocking device 100 can be reduced.

Figure 4A:
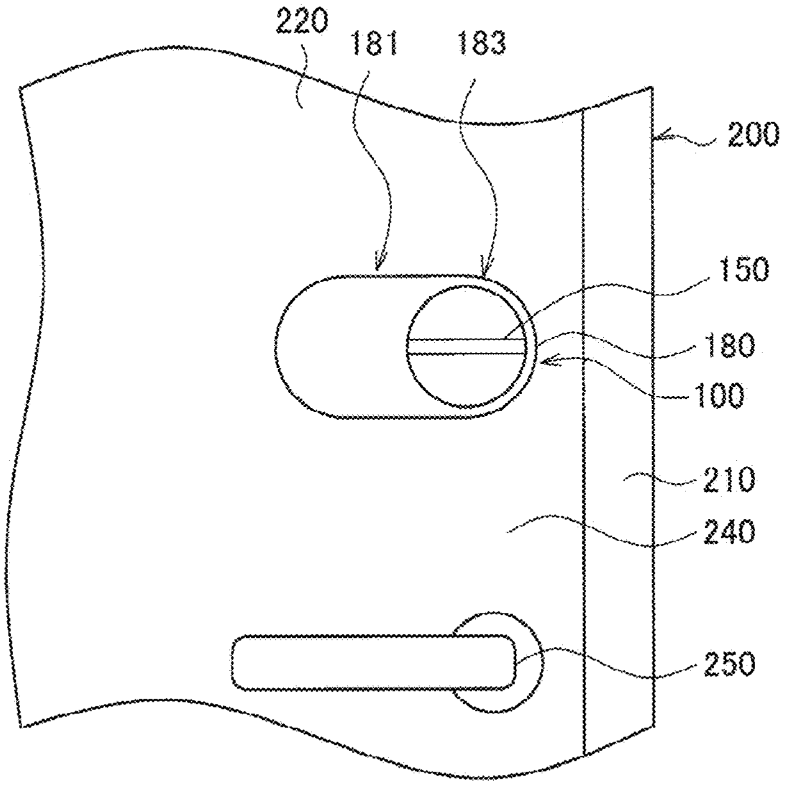
FIG. 4A is a view illustrating an example of an attached state of the locking/unlocking device according to the same embodiment.
Figure 4B:
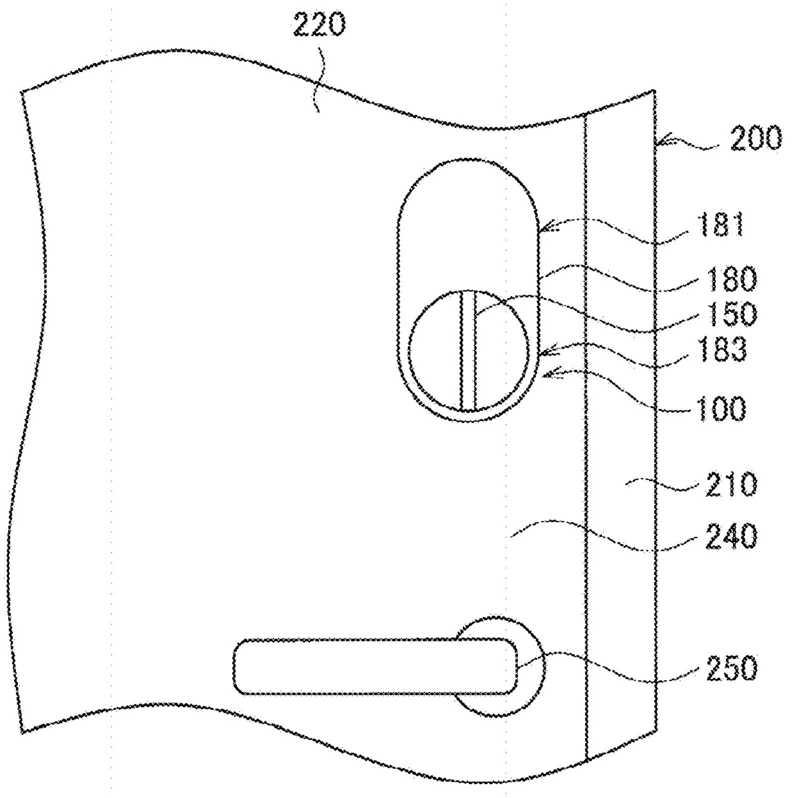
FIG. 4B is a diagram illustrating an example of an attached state of the locking/unlocking device according to the same embodiment.
Figure 4C:
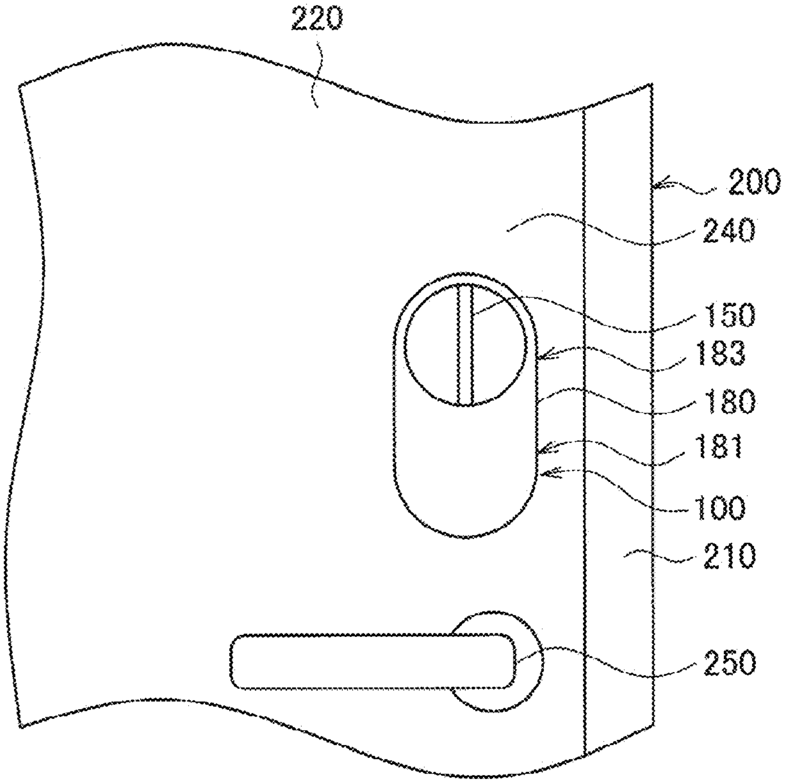
FIG. 4C is a diagram illustrating an example of an attached state of the locking/unlocking device according to the same embodiment.

The locking/unlocking device 100 according to the present embodiment may be attached to the opening/closing device 200 including a door (movable section 220) and a door frame (fixed section 210) as illustrated in FIGS. 4A to 4C, for example. As illustrated in FIG. 4A, for example, the locking/unlocking device 100 according to the present embodiment may be attached to the opening/closing device 200 such that the oval shape of the housing unit 180 is horizontally placed in the front view after attachment. In other words, the second portion 183 of the housing unit 180 may be attached to the door frame that is the fixed section 210 such that the second portion 183 is closer to the first portion 181. The magnetic detection unit 110 is provided on the end portion side of the second portion 183 of the housing unit 180, which is opposite to the first portion 181. By attaching the locking/unlocking device 100 in this manner, the distance between the magnetic detection unit 110 and the fixed section 210 becomes the shortest. Therefore, the accuracy with which the magnetic detection unit 110 detects a change in the magnetic field can be improved.

Further, in the locking/unlocking device 100 according to the present embodiment, for example, as illustrated in FIGS. 4B and 4C, the housing unit 180 may be attached to the movable section 220 of the opening/closing device 200 such that the oval shape of the housing unit 180 is vertically placed in front view. In other words, the locking/unlocking device 100 is attached to the movable section 220 such that the second portion 183 of the housing unit 180 is provided being away from the door frame that is the fixed section 210 by the same distance as the first portion 181. In this manner, the locking/unlocking device 100 may be attached such that the longitudinal direction thereof is substantially parallel to the portion of the fixed section 210 extending in the vertical direction. In this case as well, the position of the second portion 183 can be set to a position close to the fixed section 210, so that the distance between the magnetic detection unit 110 and the fixed section 210 can be shortened.

Further, in FIGS. 4B and 4C, the directions in which the locking/unlocking device 100 is attached are opposite to each other by 180°. In other words, in FIGS. 4B and 4C, with the locking/unlocking device 100 attached, the position of the first portion 181 is symmetrical with respect to the second portion 183. However, the distance between the second portion 183 of the housing unit 180 and the fixed section 210 does not change. Therefore, even when the mounting direction of the locking/unlocking device 100 is changed, the magnetic detection unit 110 comes to a position close to the fixed section 210, so that the detection accuracy of the magnetic detection unit 110 can be improved regardless of the mounting state.

1.3. Description of Control

Figure 5:
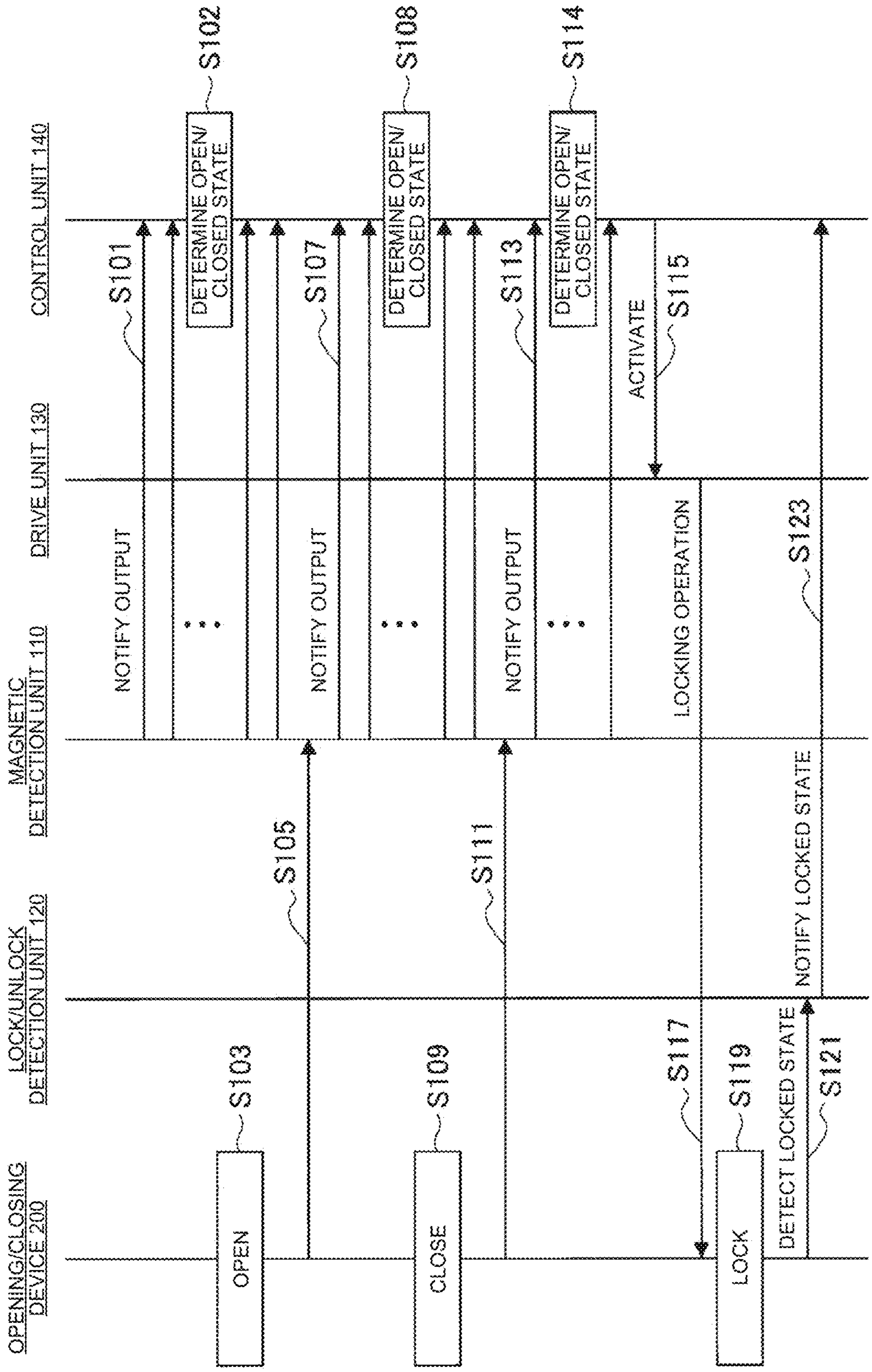
FIG. 5 is a sequence diagram illustrating an example of control of the locking/unlocking device according to the same embodiment.

The control of the locking/unlocking operation of the opening/closing device 200 of the locking/unlocking device 100 according to the present embodiment will be described with reference to FIG. 5. First, the opening/closing device 200 is assumed to be in a closed state. The magnetic detection unit 110 notifies the control unit 140 of the detection result (output) of the detected magnetic field value (S101). At this time, the notification is given at a predetermined output cycle. The output cycle may be about once every several seconds or, for example, once every 1 to 3 seconds. Upon receiving the notification in step S101, the control unit 140 determines the open/closed state of the opening/closing device 200 (S102).

When the opening/closing device 200 is opened (S103), the magnetic detection unit 110 detects a change in the magnetic field due to the opening/closing device 200 being opened (S105). When the opening/closing device 200 is opened, for example, the difference (change in magnetic field) between the magnetic field value detected by the magnetic detection unit 110 and the initial value becomes equal to or greater than a threshold value. When the detection result of the magnetic field value is notified to the control unit 140 by the magnetic detection unit 110 (S107), the control unit 140 receives the notification in step S107 and determines that opening/closing device 200 is in an open state (S108).

When the operation of opening the opening/closing device 200 is completed and the opening/closing device 200 is again closed (S109), the magnetic detection unit 110 detects a change in the magnetic field due to the opening/closing device 200 being closed (S111). The magnetic detection unit 110 notifies the control unit 140 of the detection result of the detected magnetic field value at the predetermined output cycle (S113). Upon receiving the notification in step S113, the control unit 140 determines the open/closed state of the opening/closing device 200 (S114).

The control unit 140 activates the drive unit 130 after determining that the opening/closing device 200 is in the closed state (S115). At this time, the control unit 140 may activate the drive unit 130 to drive the lock mechanism 230 until the lock mechanism is in the locked state when the opening/closing device 200 is in the open state and then in the closed state. Alternatively, the control unit 140 may activate the drive unit 130 to drive the lock mechanism 230 until the lock mechanism is in the locked state when the open/close state of the opening/closing device 200 changes from the closed state, the open state, and then the closed state in order.

In response to the instruction from the control unit 140 in step S115, the drive unit 130 drives the lock mechanism 230 until the lock mechanism is in the locked state (S117). As a result, the opening/closing device 200 is in the locked state (S119).

When the lock/unlock detection unit 120 detects that the lock mechanism 230 is in the locked state (S121), the lock/unlock detection unit 120 notifies the control unit 140 that the lock mechanism 230 is in the locked state (S123).

In steps S102, S108 and S114, as an example of the determination of the open/closed state of the opening/closing device 200 performed by the control unit 140, it may be determined that the opening/closing device 200 is closed in a case where the difference between the detected magnetic field value and the initial value (change in magnetic field) is less than the threshold value. Further, the control unit 140 may determine that the opening/closing device 200 is in the open state in a case where the difference between the detected magnetic field value and the initial value is equal to or more than the threshold value. As another determination, the open state or the closed state may be determined from an absolute value of the detected magnetic field value. Furthermore, as another determination, the open state or the closed state may be determined by comparing the detected magnetic field value with an immediately preceding value.

Effect

The configuration and control of the locking/unlocking device 100 according to the present embodiment have been described above. The locking/unlocking device 100 according to the present embodiment has the magnetic detection unit 110 that detects a change in the magnetic field due to a change in the relative position between the fixed section 210 and the movable section 220 of the opening/closing device 200. With this configuration, the open/closed state of the opening/closing device 200 can be detected with high accuracy, and the locking/unlocking operation can be reliably controlled. In particular, since the change in the magnetic field can be detected even when the opening/closing angle of the opening/closing device 200 is 10° or less, the opening/closing state can be detected from immediately after the start of the opening/closing operation to the complete of the operation. Therefore, the control of the locking/unlocking operation based on the open/closed state by the control unit 140 can be performed quickly and reliably.

Further, by setting the position of the magnetic detection unit 110 close to the fixed section 210 inside the housing unit 180, the detection accuracy of the open/closed state of the opening/closing device 200 can be further improved. Further, by setting the position of the magnetic detection unit 110 to a position far from the motor as the drive source 131 in the housing unit 180, the detection of noise by the magnetic detection unit 110 can be reduced and the magnetic field value can be measured with high accuracy.

Further, when the locking/unlocking device 100 according to the present embodiment is controlled as described above, the opening/closing of the door can be accurately detected according to the open/close state of the opening/closing device 200, and the locking/unlocking timing can be optimized. In particular, when it is determined that the opening/closing device 200 is in the open state and then it is determined that the opening/closing device 200 is in the closed state, the lock mechanism 230 is set to the locked state, whereby the locking timing can be optimized.

Further, in the locking/unlocking device 100 according to the present embodiment, the control unit 140 determines that the opening/closing device 200 is in the closed state when the difference between the detected magnetic field value and the initial value (the change in the magnetic field) is less than the threshold value, and determines that the opening/closing device 200 is in the open state when the detected change in the magnetic field is equal to or greater than the threshold value. With this configuration, the locking/unlocking operation can be reliably controlled without mistakenly recognizing a slight change in the magnetic field due to noise or the like as a change in the open/closed state. Further, since the change in the magnetic field is determined on the basis of the threshold value, the change in the magnetic field can be reliably detected without being affected by the magnetic field around the original state where the locking/unlocking device 100 is attached.

Further, in the locking/unlocking device 100 according to the present embodiment, the magnetic detection unit 110 can notify the control unit 140 of the detection result of the detected magnetic field value at a predetermined output cycle. With this configuration, the detection result of the magnetic detection unit 110 can be reliably notified to the control unit 140. Further, even when the detection result of the magnetic detection unit 110 changes, it is possible to promptly notify the control unit 140 of the change. Further, since the detection result of the magnetic detection unit 110 is periodically notified to the control unit 140, it becomes easier for the control unit 140 to grasp the time-series change of the detection result, and the control based on the open/closed state of the opening/closing device 200 is surely performed.

Modification Example

Figure 6:
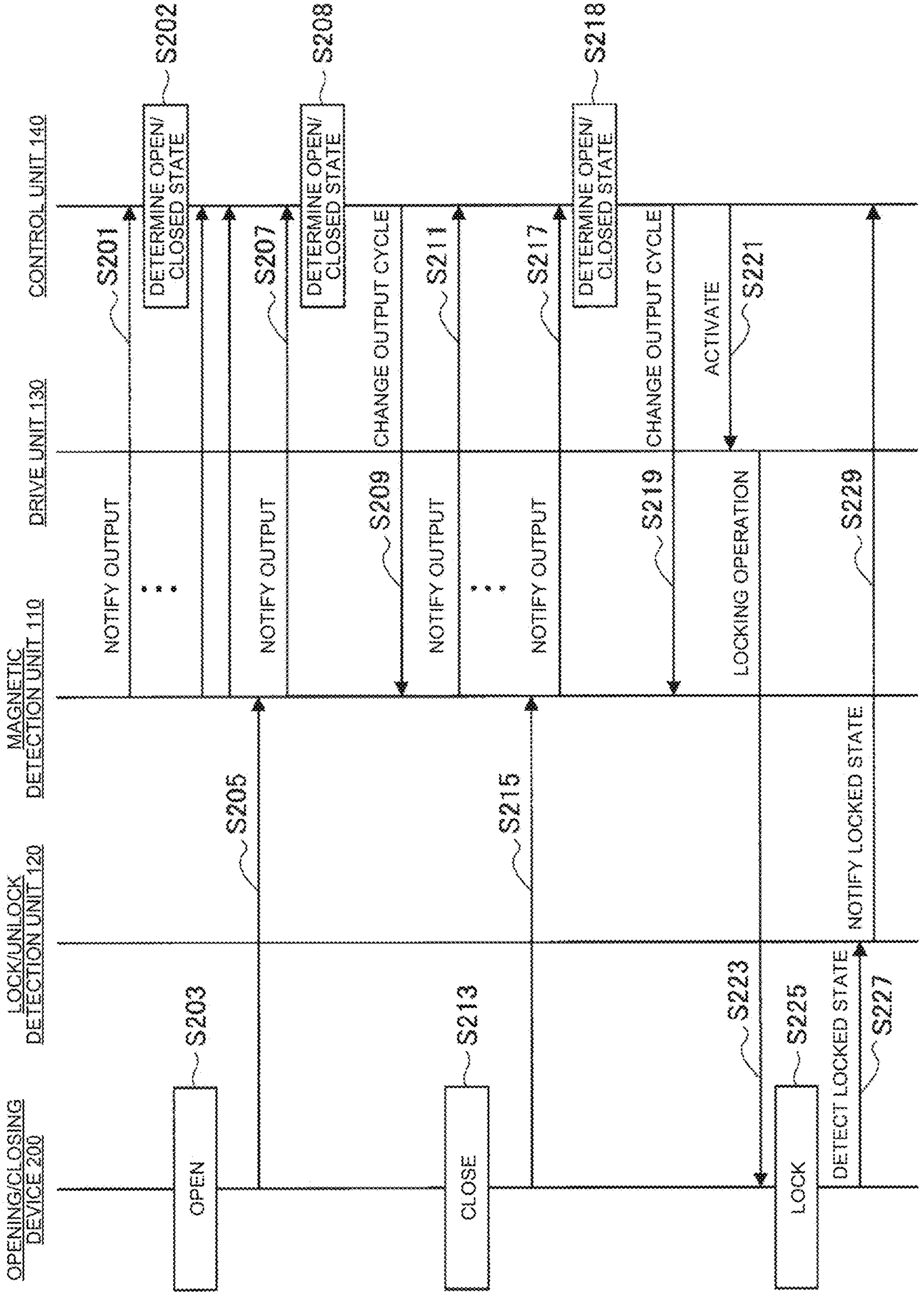
FIG. 6 is a sequence diagram illustrating an example of control of a locking/unlocking device according to a modification example of the same embodiment.

A modification example of the present embodiment will be described with reference to FIG. 6. In this modification example, the output cycle of the magnetic detection unit 110 is changed according to the open/closed state of the opening/closing device 200. Note that the same components and controls as those of the first embodiment are designated by the same reference numerals and the description thereof will be omitted.

First, the opening/closing device 200 is in a closed state. With the opening/closing device 200 closed, the magnetic detection unit 110 notifies the control unit 140 of the detection result of the detected magnetic field value (S201). At this time, the notification may be performed at a predetermined output cycle. As an example of the output cycle, the frequency may be about once every 1 to 3 seconds. Upon receiving the notification in step S201, the control unit 140 determines the open/closed state of the opening/closing device 200 (S202).

After that, when the opening/closing device 200 is opened (S203), the magnetic detection unit 110 detects a change in the magnetic field due to the opening/closing device being opened (S205). The magnetic detection unit 110 notifies the control unit 140 of the detection result of the value of the magnetic field detected in the open state of the opening/closing device 200 at a predetermined output cycle (S207). Upon receiving the notification in step S207, the control unit 140 determines the open/closed state of the opening/closing device 200 (S208). Further, the control unit 140 receives the notification in step S207, and instructs the magnetic detection unit 110 to change the output cycle of the notification after the opening/closing device 200 is in the open state (S209). At this time, the predetermined output cycle may be changed to a cycle shorter than the output cycle of the notification of the closed state. In other words, the frequency of notification from the magnetic detection unit 110 to the control unit 140 may be increased. As an example of the output cycle, the frequency may be about once per second, and particularly, the frequency may be about once per less than a second. The magnetic detection unit 110 notifies the control unit 140 of the detection result of the magnetic field value at the changed predetermined output cycle (S211).

When the operation of opening the opening/closing device 200 is completed and the opening/closing device 200 is in the closed state again (S213), the magnetic detection unit 110 detects a change in the magnetic field due to the opening/closing device 200 being closed (S215). The magnetic detection unit 110 notifies the control unit 140 of the detection result of the detected magnetic field value at a predetermined output cycle (S217). Upon receiving the notification in step S217, the control unit 140 determines the open/closed state of the opening/closing device 200 (S218). Further, upon receiving the notification in step S217, the control unit 140 instructs the magnetic detection unit 110 to change the output cycle of the notification (S219). As an example of the output cycle, the frequency may be about once every 1 to 3 seconds. The subsequent steps S221 to S229 are the same as the steps S115 to S123 in FIG. 5. Further, in steps S202, S208 and S218, the method of determining the open/closed state of the opening/closing device 200 performed by the control unit 140 is the same as that in steps S102, S108 and S114 of the first embodiment.

As described above, in the present modification example, the open/closed state of the opening/closing device 200 can be detected with high accuracy by changing the cycle of notification of the detection result from the magnetic detection unit 110 according to the open/closed state of the opening/closing device 200. In particular, the open/closed state of the opening/closing device 200 may be detected with high accuracy in a condition where the time required to open and close the opening/closing device 200 is generally several seconds to several tens of seconds, and the output cycle of the notification of the detection result of the magnetic detection unit 110 from the open state to the closed state of the opening/closing device 200 is less than a second. In other words, the open/closed state of the opening/closing device 200 may be detected with high accuracy by increasing the notification frequency after the opening/closing device 200 is opened. Further, when the opening/closing device 200 is closed, the consumed power of the locking/unlocking device 100 can be suppressed and the battery life can be extended by reducing the frequency of notification.

2. Second Embodiment

Figure 7:
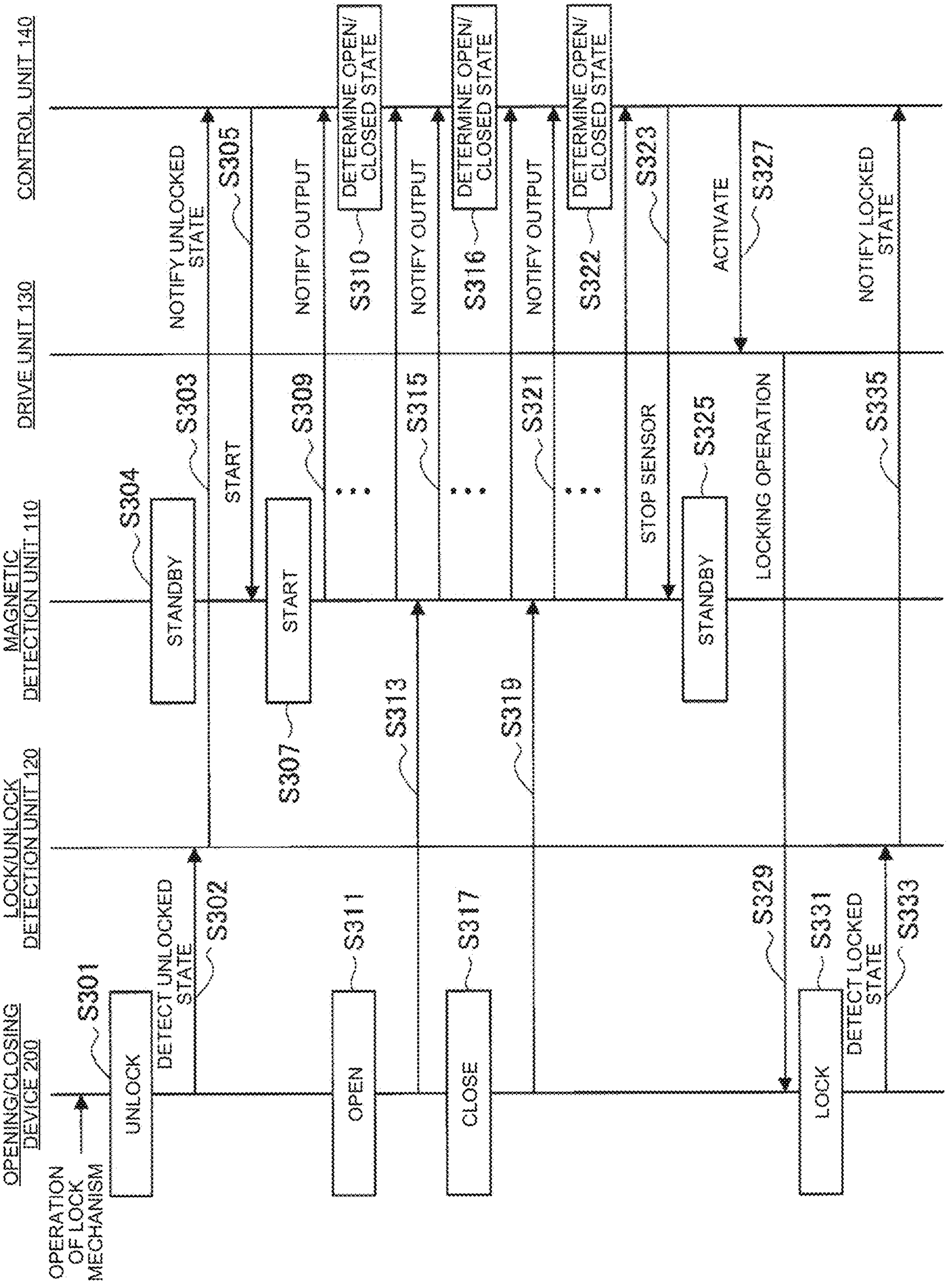
FIG. 7 is a sequence diagram illustrating an example of control of a locking/unlocking device according to a second embodiment of the present disclosure.

Control of the locking/unlocking operation of the locking/unlocking device 100 according to the present embodiment will be described with reference to FIG. 7. Note that the same components and controls as those of the first embodiment are designated by the same reference numerals and the description thereof will be omitted.

First, for example, the user operates the lock mechanism 230 of the opening/closing device 200 to unlock the opening/closing device 200 (S301). When the lock/unlock detection unit 120 detects the unlocked state (S302), the lock/unlock detection unit 120 notifies the control unit 140 of the unlocked state (S303). At this time, the magnetic detection unit 110 is in a standby state (stop state) in order to suppress power consumption (S304). The standby state (stop state) includes a state where the magnetic detection unit 110 is not operating, and also includes a state where the magnetic detection unit 110 is operating but consumes less power than an active state. Upon receiving the notification in step S303, the control unit 140 starts the magnetic detection unit 110 (S305). The started magnetic detection unit 110 notifies the control unit 140 of the detection result of the detected magnetic field value (S309). At this time, the notification may be performed at a predetermined output cycle. As an example of the output cycle, the frequency may be about once per second or less. Upon receiving the notification in step S309, the control unit 140 determines the open/closed state of the opening/closing device 200 (S310).

After that, when the opening/closing device 200 is in the open state (S311), the magnetic detection unit 110 detects a change in the magnetic field due to the opening/closing device 200 being opened (S313). The magnetic detection unit 110 notifies the control unit 140 of the detection result of the magnetic field value detected in the open state of the opening/closing device 200 at a predetermined output cycle (S315). Upon receiving the notification in step S315, the control unit 140 determines the open/closed state of the opening/closing device 200 (S316).

When the operation of opening the opening/closing device 200 is completed and the opening/closing device 200 is in the closed state again (S317), the magnetic detection unit 110 detects a change in the magnetic field due to the opening/closing device 200 being closed (S319). The magnetic detection unit 110 notifies the control unit 140 of the detection result of the detected magnetic field value at the predetermined output cycle (S321). The control unit 140 receives the notification in step S321 and determines the open/closed state of the opening/closing device 200 (S322).

When determining that the opening/closing device 200 is in the closed state, the control unit 140 stops the magnetic detection unit 110 (S323). After that, the magnetic detection unit 110 is in the standby state (S325). The processing of steps S327 to S335 is the same as the processing of steps S115 to S123 in FIG. 5.

In steps S310, S316, and S322, the method of determining the open/closed state of the opening/closing device 200 performed by the control unit 140 is the same as that in steps S102, S108, and S114 of the first embodiment.

Effect

The control of the locking/unlocking device 100 according to the present embodiment has been described above. The locking/unlocking device 100 according to the present embodiment can suppress the consumed power of the magnetic detection unit 110 by performing the above control. As an example, the current consumption of the normal magnetic detection unit 110 is about 50 uA when the polling interval is once per second, whereas the current consumption in the standby state can be 1 uA or less. In this manner, the magnetic detection unit 110 is activated only when the opening/closing device 200 is in the unlocked state, and the magnetic detection unit 110 is made in the standby state when the opening/closing device 200 is locked and not to be opened, thereby consumed power of the magnetic detection unit 110 can be suppressed and the battery life can be extended.

Further, when it is determined that the opening/closing device 200 is in the closed state, the open state, and then the closed state in order, the locking/unlocking device 100 according to the present embodiment causes the magnetic detection unit 110 to be in the standby state (stop state). With this configuration, the magnetic detection unit 110 can be set in the standby state after determining that the opening/closing operation of the opening/closing device 200 has been surely completed. Since the magnetic detection unit 110 of the locking/unlocking device 100 according to the present embodiment detects a change in the magnetic field due to a relative position change between the movable section 220 and the fixed section 210, the magnetic detection unit 110 can accurately detect the change in the open/closed state of the opening/closing device 200. In addition, by keeping the magnetic detection unit 110 in the standby state until next opening/closing operation is performed, the consumed power of the magnetic detection unit 110 can be suppressed and the battery life can be extended.

Further, the locking/unlocking device 100 according to the present embodiment causes the magnetic detection unit 110 to be in the standby state (stop state) and then activates the drive unit 130 to drive the lock mechanism 230 until the lock mechanism is in the locked state. As a result, the magnetic detection unit 110 is in the standby state while the drive unit is operating, and thus vibration or magnetic noise caused by the drive unit 130 is not detected. In particular, when the drive source 131 of the drive unit 130 is a motor, such a method is effective because the influence of magnetic noise is great.

Modification Example 1

As a modification example of the second embodiment, for example, with the opening/closing device 200 closed as an initial state, the magnetic detection unit 110 is started by the control unit 140, and then the magnetic detection unit 110 may notify the control unit 140 of the detection result of the closed state of the opening/closing device 200. Thereby, the control unit 140 can acquire the detection result of the magnetic field in the initial state. Immediately after starting, the magnetic detection unit 110 has a large variation in the detection results of the values of the changes in the magnetic field. Therefore, by acquiring the value of the magnetic field in the closed state, the control unit 140 can accurately determine the open/closed state of the opening/closing device 200 thereafter.

Modification Example 2

As another modification example of the second embodiment, not only the magnetic detection unit 110 but also the control unit 140 can be in the standby state (stop state). In other words, for example, the user operates the lock mechanism 230 of the opening/closing device 200 to unlock the opening/closing device 200. When the lock/unlock detection unit 120 detects the unlocked state, the lock/unlock detection unit 120 notifies the control unit 140 of the unlocked state. At this time, the control unit 140 is in a standby state (stop state) in order to suppress power consumption. Upon receiving the notification of the unlocked state, the control unit 140 starts up from the standby state. The control unit 140 in the active state starts the magnetic detection unit 110 that is in the standby state. The subsequent processing is the same as the processing after step S309 in FIG. 7.

In the present modification example, by performing the above control, it is possible to suppress the consumed power of not only the magnetic detection unit 110 but also the control unit 140. The consumed power of the magnetic detection unit 110 and the control unit 140 can be suppressed and the battery life can be extended since the magnetic detection unit 110 and the control unit 140 are activated only when the opening/closing device 200 is in the unlocked state, and the magnetic detection unit 110 and the control unit 140 are in the standby state when the opening/closing device 200 is locked and not opened.

Modification Example 3

As another modification example of the second embodiment, the magnetic detection unit 110 may not always be in the standby state in the locked state, but may be temporarily started so that the magnetic detection unit 110 notifies the control unit 140 of the output result. In other words, in this modification example, the cycle of the output from the magnetic detection unit 110 can be changed according to the locked/unlocked state of the opening/closing device 200.

First, when the opening/closing device 200 is in the locked state, the magnetic detection unit 110 is temporarily started in a predetermined cycle to notify the control unit 140 of the output result. An example of the cycle is about once every few minutes. Next, the user operates the lock mechanism 230 of the opening/closing device 200 to unlock the opening/closing device 200. When the lock/unlock detection unit 120 detects the unlocked state, the lock/unlock detection unit 120 notifies the control unit 140 of the unlocked state.

Upon receiving the notification, the control unit 140 starts the magnetic detection unit 110. The started magnetic detection unit 110 notifies the control unit 140 of the detection result of the detected magnetic field value. At this time, the notification may be performed at a predetermined output cycle. The output cycle is shorter than the cycle at which the magnetic detection unit 110 is temporarily started in the locked state and the detection result is notified. As an example of the output cycle, the frequency may be about once per second or less.

When the opening/closing device 200 is in the locked state, the lock/unlock detection unit 120 detects the locked state and notifies the control unit 140 of the locked state. Upon receiving the notification, the control unit 140 stops the magnetic detection unit 110. Although the magnetic detection unit 110 is in the standby state, the magnetic detection unit 110 is temporarily started at a predetermined cycle even in the standby state, and notifies the control unit 140 of the detection result.

In this modification example, the magnetic detection unit 110 is made in a standby state when the opening/closing device 200 is locked and not to be opened, so that the consumed power of the magnetic detection unit 110 and the control unit 140 can be suppressed and their battery life can be extended. Furthermore, even in the standby state, the magnetic detection unit 110 is temporarily started to detect the change in the magnetic field, so that the fluctuation of the peripheral magnetic field can be detected in advance, and the detection accuracy of the change in the magnetic field when the opening/closing device 200 is opened or closed can be increased.

3. Third Embodiment

Figure 8:
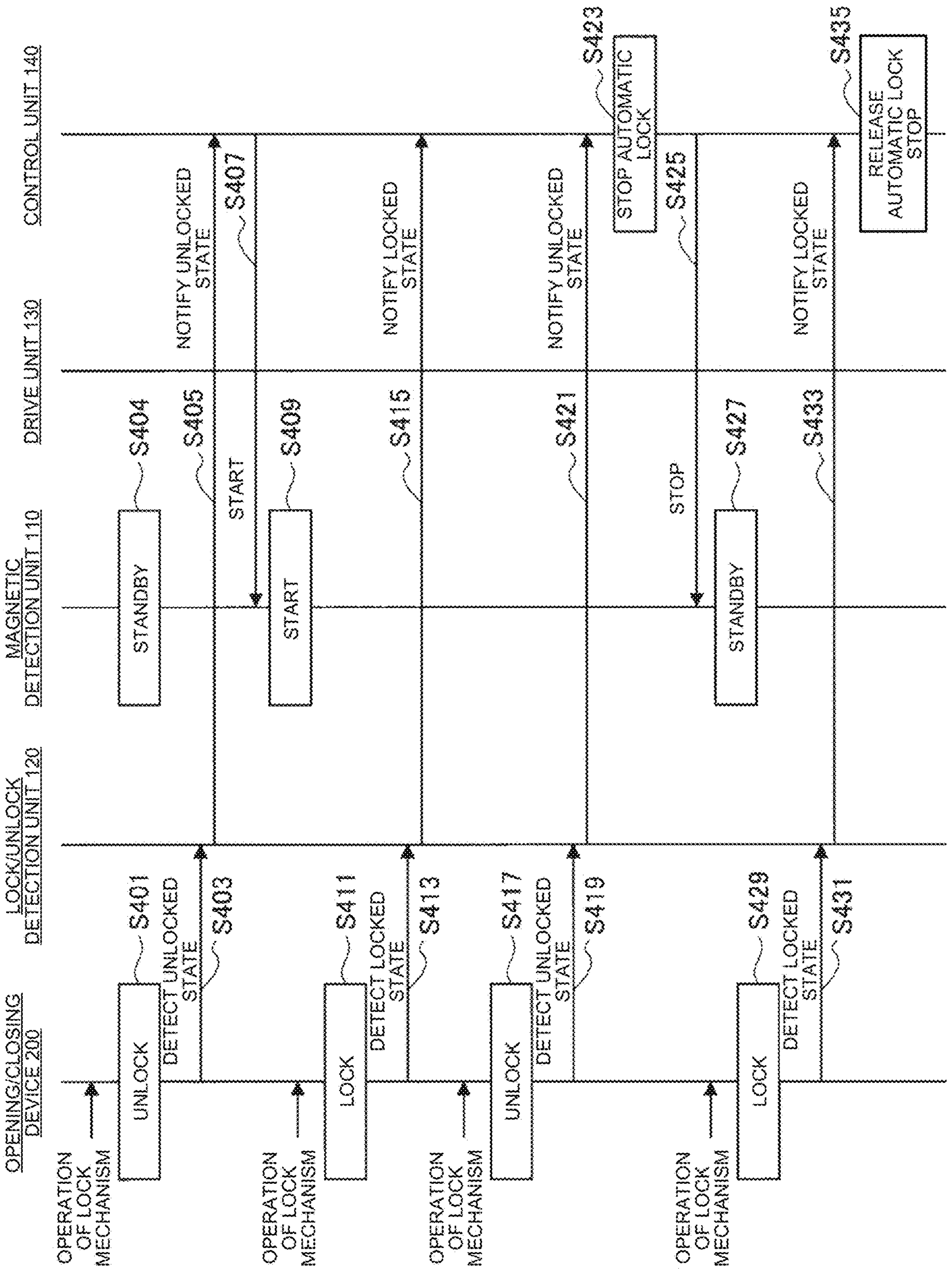
FIG. 8 is a sequence diagram illustrating an example of control of a locking/unlocking device according to a third embodiment of the present disclosure.

Next, a third embodiment will be described with reference to FIG. 8. Note that the same components and controls as those of the other embodiments are designated by the same reference numerals and the description thereof will be omitted.

The locking/unlocking device 100 according to the present embodiment can temporarily stop the automatic lock control by using a predetermined operation as a trigger. In other words, as illustrated in FIG. 8, for example, the user operates the lock mechanism 230 to unlock the opening/closing device 200 (S401). When the unlocked state is detected by the lock/unlock detection unit 120 (S403), the lock/unlock detection unit 120 notifies the control unit 140 of the unlocked state (S405). At this time, the magnetic detection unit 110 is in the standby state (S404). Upon receiving the notification in step S405, the control unit 140 starts the magnetic detection unit 110 (S407) and brings the magnetic detection unit 110 into the active state (S409).

After that, for example, when the user operates the lock mechanism 230 again and brings the opening/closing device 200 into the locked state (S411), the lock/unlock detection unit 120 detects that the lock mechanism 230 is in the locked state (S413), and notifies the control unit 140 of the locked state (S415). Furthermore, for example, when the user operates the lock mechanism 230 and brings the opening/closing device 200 into the unlocked state (S417), the lock/unlock detection unit 120 detects that the lock mechanism 230 is unlocked (S419) and notifies the control unit 140 of the unlocked state (S421).

As described above, when the control unit 140 determines that the lock mechanism 230 has been unlocked multiple times within a predetermined time, the control unit 140 stops the automatic lock control after determining that the opening/closing device 200 has been finally unlocked (S423). Further, the control unit 140 transmits a signal for stopping the magnetic detection unit 110 to the magnetic detection unit 110 (S425), and the magnetic detection unit 110 becomes the standby state (S427). In a case where the automatic lock control is temporarily stopped, the unlocking operation becomes unnecessary when the user goes out for a short time. After that, when the lock mechanism 230 is operated, the opening/closing device 200 is in the locked state again (S429). When the locked state is detected by the lock/unlock detection unit 120 (S431), the lock/unlock detection unit 120 notifies the control unit 140 of the locked state (S433). The control unit 140 releases the automatic lock stop (S435) and performs normal automatic lock control.

Effect

The control of the locking/unlocking device 100 according to the present embodiment has been described above. The locking/unlocking device 100 according to the present embodiment can temporarily stop the automatic lock control by performing the above control. As a result, the unlocking operation becomes unnecessary when the user goes out for a short time. Further, since the automatic lock control is automatically stopped by operating the lock mechanism 230 a plurality of times, it is not necessary to additionally attach an automatic lock stop button or the like, and the locking/unlocking device 100 can be made compact and inexpensive.

According to the present embodiment, the unlocking operation is set to be performed twice within a predetermined time as a trigger for stopping the automatic lock control, but the present disclosure is not limited to such an example. For example, the automatic lock control may be set to be stopped when the unlocking operation is performed more than twice within a predetermined time. Further, not only the unlocking operation but also the locking operation or a combination of the locking operation and the unlocking operation may be used as a trigger to stop the automatic lock control.

4. Fourth Embodiment

The configuration of the locking/unlocking device 100 according to a fourth embodiment of the present disclosure will be described. First, a situation in which the locking/unlocking device 100 according to the present embodiment is applied will be described. According to the present embodiment, when the user approaches the opening/closing device 200, the user performs unlocking operation using a communication terminal 300 instead of the conventional manual operation. Therefore, the user can unlock the key without taking out a key and operating the lock mechanism 230. In such a situation, the locking/unlocking device 100 according to the present embodiment can accurately detect the opening/closing of the opening/closing device 200 and optimize the timing of locking/unlocking.

Figure 9:
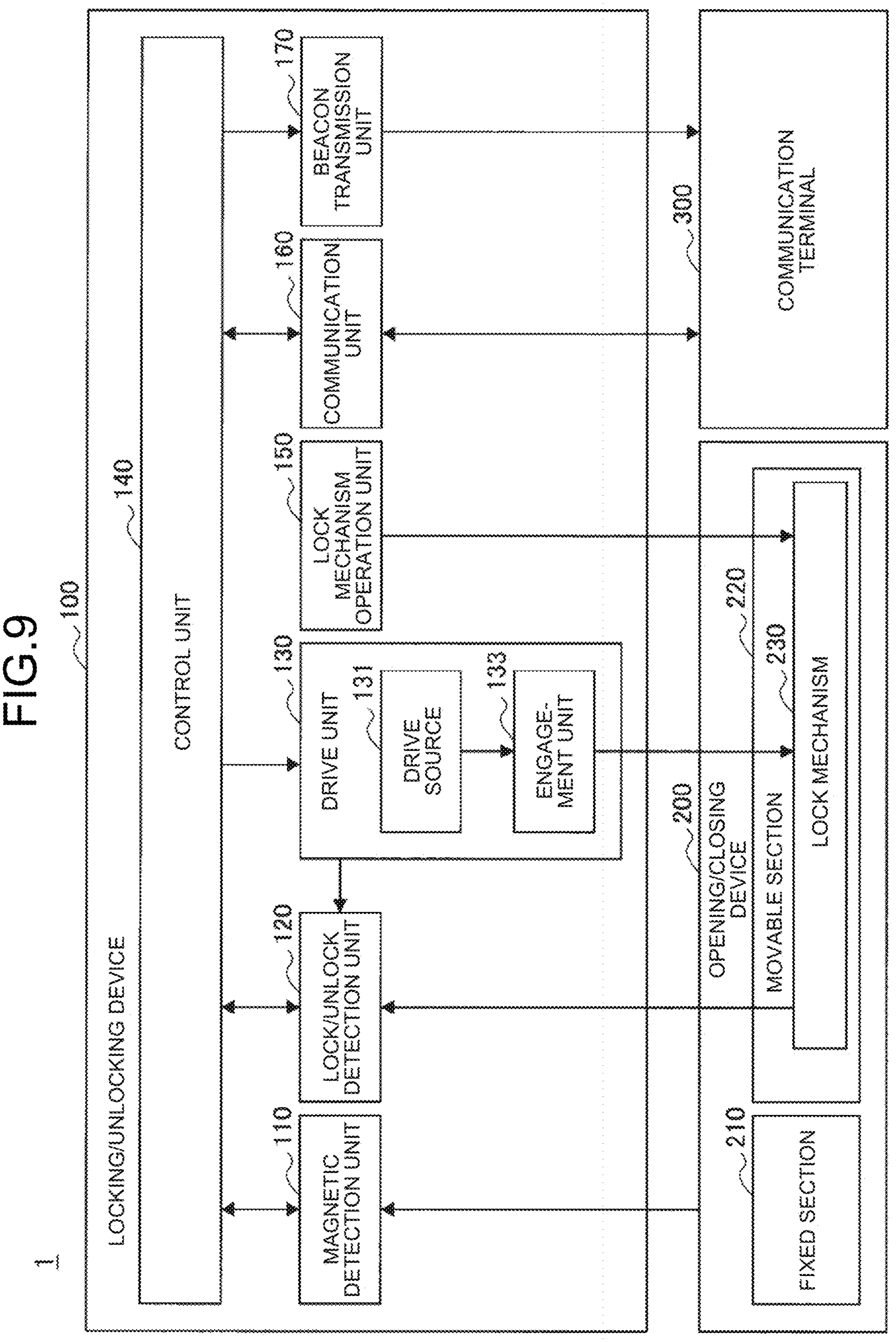
FIG. 9 is a block diagram illustrating an example of a configuration of a locking/unlocking device according to fourth and fifth embodiments of the present disclosure.

With reference to FIG. 9, a schematic configuration of the locking/unlocking device 100 according to the fourth embodiment of the present disclosure will be described. Note that the same components and controls as those of the other embodiments are designated by the same reference numerals and the description thereof will be omitted. As illustrated in FIG. 9, the locking/unlocking device 100 according to the fourth embodiment further includes a communication unit 160, as compared with the locking/unlocking device 100 illustrated in FIG. 1.

4.1. Overall Configuration of Locking/Unlocking Device 100

The communication unit 160 transmits/receives information to/from the communication terminal 300 existing outside the locking/unlocking device 100 by wireless communication. As an example of a wireless communication system, there are Bluetooth (registered trademark), Wi-Fi, NFC, and the like. The communication unit 160 includes a reception unit that receives a signal transmitted from the communication terminal 300. Further, the communication unit 160 also includes a transmission unit that transmits a signal to the communication terminal 300.

The communication terminal 300 performs wireless communication with the locking/unlocking device 100. As an example of the communication terminal 300, there are a mobile terminal such as a smartphone, a tablet, and an electronic device for locking/unlocking, and an indoor stationary terminal that can be connected to the Internet or Wi-Fi.

4.2. Description of Control

Figure 10:
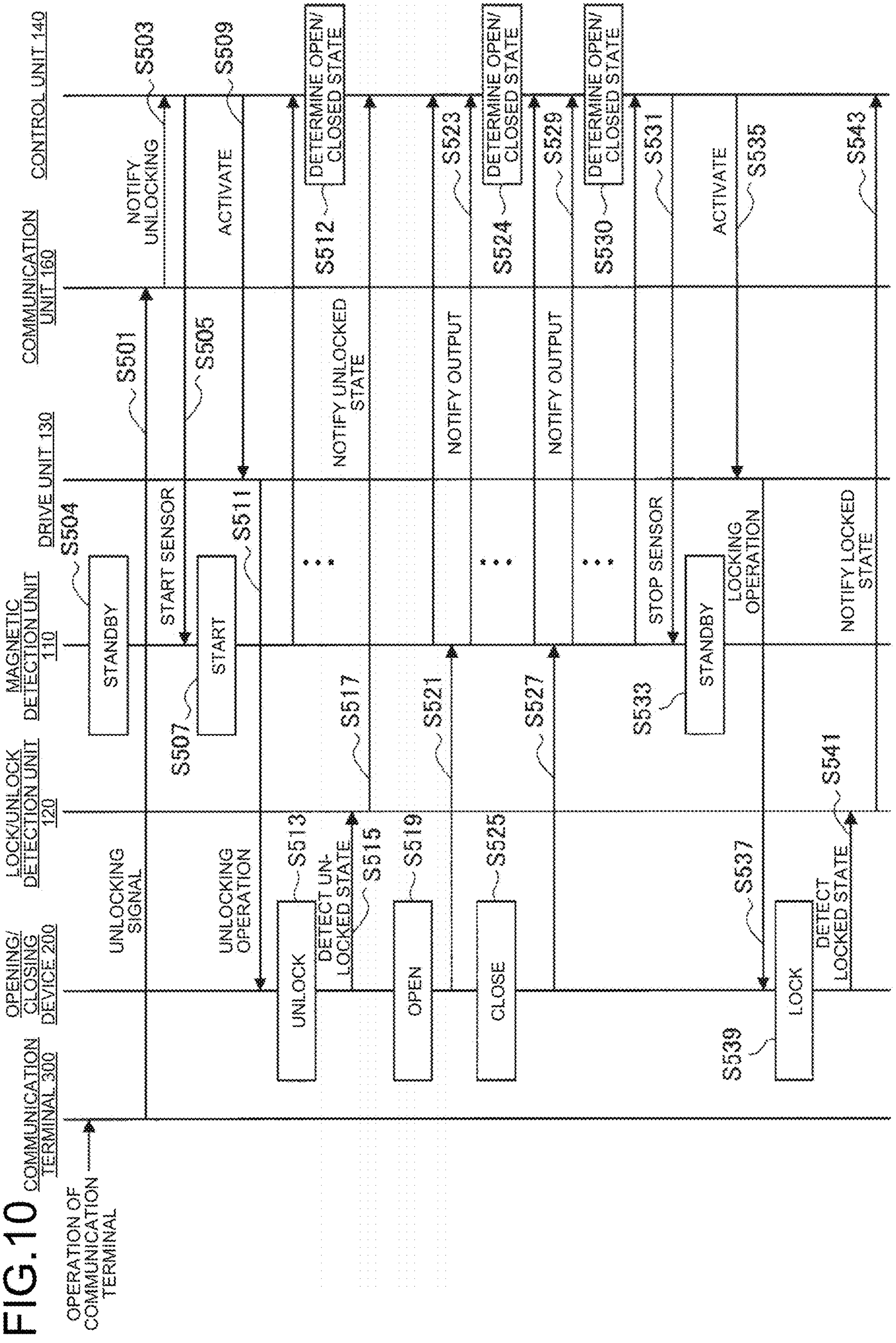
FIG. 10 is a sequence diagram illustrating an example of control of the locking/unlocking device according to the fourth embodiment of the present disclosure.

Control of the locking/unlocking operation of the locking/unlocking device 100 according to the fourth embodiment of the present disclosure will be described with reference to FIG. 10. Note that the same reference numerals are given to the control common to the other embodiments and the description thereof will be omitted.

For example, when the user operates the communication terminal 300 to unlock the opening/closing device 200, a signal for unlocking the opening/closing device 200 is transmitted from the communication terminal 300 (S501). Upon receiving the unlock signal, the communication unit 160 notifies the control unit 140 of the unlocking (S503). At this time, the magnetic detection unit 110 is in a standby state (stop state) in order to suppress power consumption (S504). Upon receiving the notification in step S503, the control unit 140 starts the magnetic detection unit 110 (S505), and the magnetic detection unit 110 is in the active state (S507). Further, the control unit 140 activates the drive unit 130 (S509), the drive unit 130 drives the lock mechanism 230 (S511), and brings the opening/closing device 200 into the unlocked state (S513). The control unit 140 determines the open/closed state on the basis of the output from the magnetic detection unit 110 (S512). The lock/unlock detection unit 120 detects the unlocked state (S515), and notifies the control unit 140 of the unlocked state (S517). Subsequent processing of steps S519 to S543 is performed in the same manner as the processing of steps S311 to S335 in FIG. 7.

Effect

The control of the locking/unlocking device 100 according to the present embodiment has been described above. The locking/unlocking device 100 according to the present embodiment has a communication unit 160 capable of wireless communication with the communication terminal 300. Accordingly, the unlock signal can be directly transmitted from the communication terminal 300 to the locking/unlocking device 100 without operating a key or the like. Further, upon receiving the unlock signal, the magnetic detection unit 110 is started, and then the opening/closing device 200 is in the unlocked state and the opening/closing device 200 is opened/closed. Therefore, since the opening/closing operation is performed after a lapse of a certain period of time from the start of the magnetic detection unit 110, the open/closed state of the opening/closing device 200 can be detected in a state where the detection result of the magnetic detection unit 110 is stable.

5. Fifth Embodiment

The configuration and control of the locking/unlocking operation of the locking/unlocking device 100 according to a fifth embodiment of the present disclosure will be described. Note that the same reference numerals are given to the control common to the other embodiments and the description thereof will be omitted. As illustrated in FIG. 9, the locking/unlocking device 100 according to the fifth embodiment further includes a communication unit 160 and a beacon transmission unit 170, as compared with the locking/unlocking device 100 illustrated in FIG. 1.

The beacon transmission unit 170 transmits a beacon signal to the outside of locking/unlocking device 100. When the beacon signal is received by the communication terminal 300, the communication terminal 300 starts an application and starts scanning a connection start signal (advertisement signal) for starting a wireless communication connection from the locking/unlocking device 100. The application may be started in the background. Note that the beacon signal is not limited to a position information signal transmitted at a predetermined cycle, and may be any signal as long as reception of the signal by the communication terminal 300 causes the communication terminal 300 to start scanning the advertisement signal.

Note that the advertisement signal transmitted from communication unit 160 and the beacon signal transmitted from the beacon transmission unit 170 may be any signal that allows the communication terminal 300 to recognize the difference between the two signals. Further, the communication unit 160 and the beacon transmission unit 170 do not have to be provided inside the locking/unlocking device 100 as separate bodies, and may be provided as a common part or circuit element. Also, the advertisement signal and the beacon signal can be transmitted at independent cycles.

Figure 11:
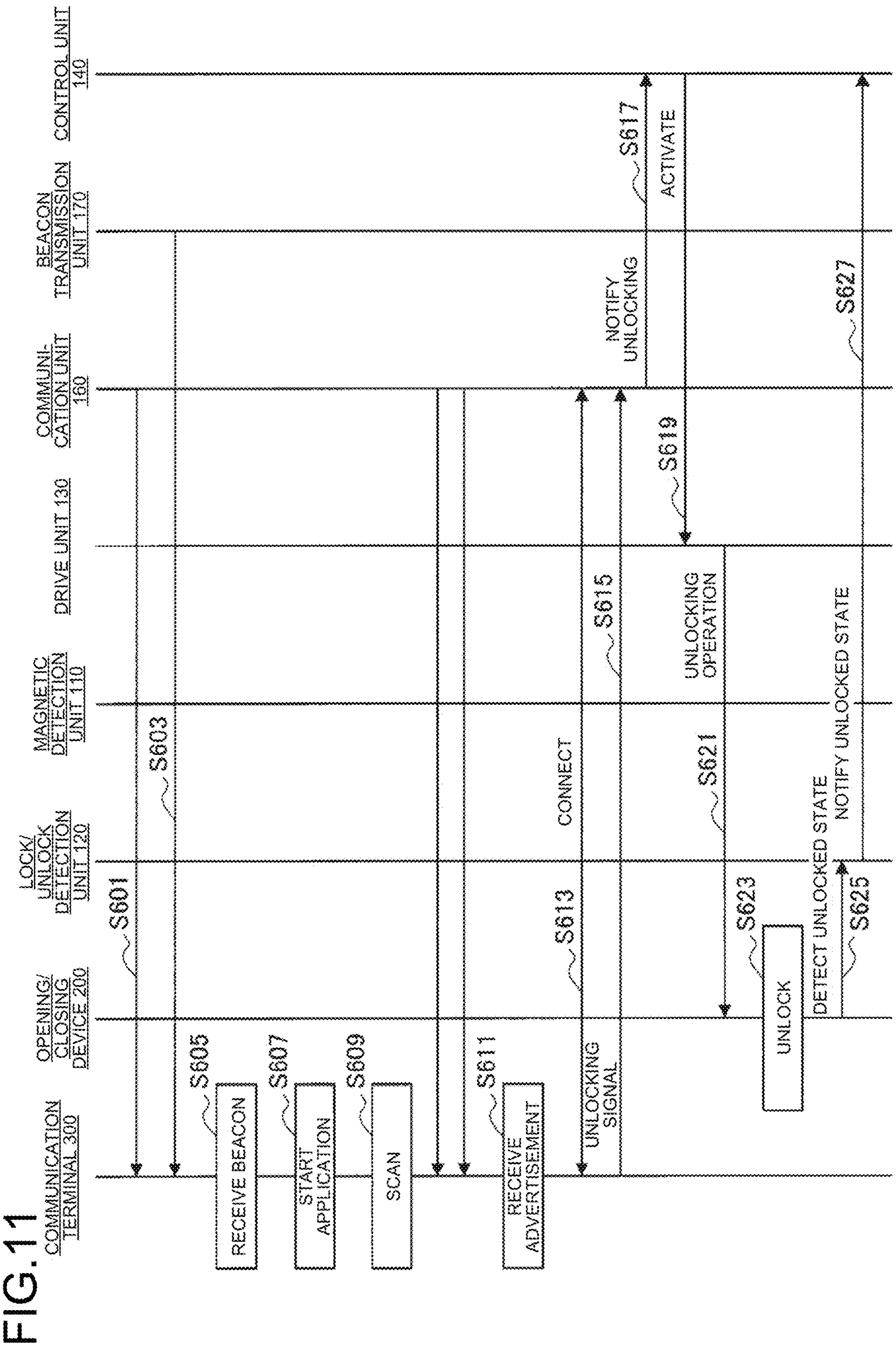
FIG. 11 is a sequence diagram illustrating an example of control of the locking/unlocking device according to the fifth embodiment of the present disclosure.

With reference to FIG. 11, control of the locking/unlocking operation of the locking/unlocking device 100 according to the fifth embodiment of the present disclosure will be described. The communication unit 160 of the locking/unlocking device 100 transmits the connection start signal (advertisement signal) (S601). Further, the beacon transmission unit 170 transmits the beacon signal (S603). Upon receiving the beacon signal from the beacon transmission unit 170 (S605), the communication terminal 300 starts the application (S607) and starts scanning the advertisement signal transmitted from the communication unit 160 of the locking/unlocking device 100 (S609). When the communication terminal 300 receives the advertisement signal (S611), a wireless communication connection is established between the communication terminal 300 and the communication unit 160 of the locking/unlocking device 100 (S613), and the unlock signal is transmitted from the communication terminal 300 (S615).

The communication unit 160 that has received the unlock signal notifies the control unit 140 of the unlock (S617). At this time, the unlocking may be notified when the unlock signal exceeds a certain level. The control unit 140 activates the drive unit 130 (S619), and the drive unit 130 unlocks the opening/closing device 200 (S621). The opening/closing device 200 is in the unlocked state (S623). When the lock/unlock detection unit 120 detects that the lock mechanism 230 is in the unlocked state (S625), the lock/unlock detection unit 120 notifies the control unit 140 that the lock mechanism 230 is in the unlocked state (S627). Subsequent processing can be performed in the same manner as the processing in steps S519 to S541 in FIG. 10. Further, in step S617, the control unit 140 may start the magnetic detection unit 110 if the magnetic detection unit 110 is in the standby state after receiving the notice of the unlock and before activating the drive unit 130 in step S619.

Figure 12:
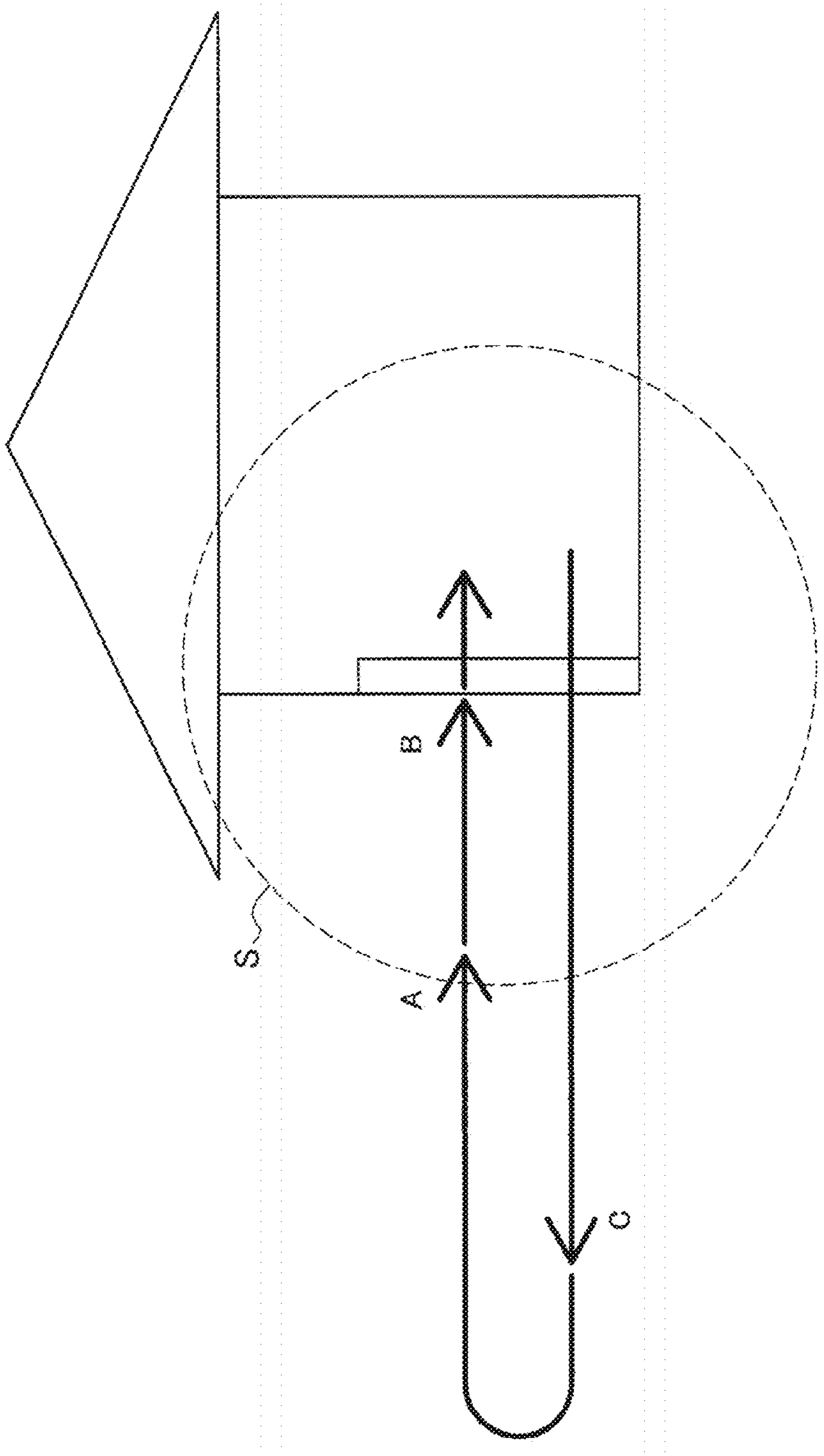
FIG. 12 is a diagram illustrating an example of a positional relationship between the locking/unlocking device and a communication terminal when locking/unlocking is performed according to the same embodiment.

The locking/unlocking operation of the locking/unlocking device 100 according to the present embodiment operates when the user comes home and enters the house, for example, as illustrated in FIG. 12. First, when the communication terminal 300 held by the user enters an area S, which is an area within a predetermined range from the locking/unlocking device 100, the communication terminal 300 can detect the beacon signal output from the beacon transmission unit 170 (point A in FIG. 12). When the communication terminal 300 detects the beacon signal, control is performed according to the sequence diagram of FIG. 11, and the locking/unlocking device 100 is unlocked in the end.

After performing the above control, when the control unit 140 determines that the intensity of the signal (advertisement signal) from the communication terminal 300 has become equal to or higher than a certain level (point B in FIG. 12), the control unit 140 determines an "at-home state". In the "at-home state", the above control by the control unit

140 is not performed. Further, when the user is not at home (point C in FIG. 12) and the strength of the signal from the communication terminal 300 is low or not detected, the control unit 140 determines "not at home" that the user is out of the house as the distance between the communication terminal 300 and the locking/unlocking device 100 away by a certain distance or more. When the communication terminal 300 detects a beacon signal in a state of "not-at-home", the above control is started.

Effect

The control of the locking/unlocking device 100 according to the present embodiment has been described above. The locking/unlocking device 100 according to the present embodiment transmits the beacon signal from the beacon transmission unit 170, performs wireless communication with the communication terminal 300 that has detected the beacon signal, and unlocks the opening/closing device 200. Therefore, the user can unlock the opening/closing device 200 without operating the communication terminal 300 at all. Further, since the communication with the communication terminal 300 is started by the beacon signal, the control can be started in a state where the communication terminal 300 is surely near the locking/unlocking device 100. For example, the locking/unlocking device 100 according to the present embodiment can more surely grasp the approach of the communication terminal 300 by using the beacon signal, compared with a case of using location information of a global positioning system (GPS). In other words, in the location information of GPS, when the accuracy is poor or is not stable, the unlock control does not work well, and unintended unlocking may occur; however, the locking/unlocking device 100 according to the present embodiment can prevent such unintended unlocking.

Modification Example 1

Subsequently, a modification example of the present embodiment will be described with reference to FIG. 13. As described above, in the locking/unlocking device 100 according to the present embodiment, when the locking/unlocking device 100 is unlocked and the user enters the room, it is determined as the "at-home state". However, when a GPS is used as the location information of the communication terminal 300, for example, if the location information of the GPS is found to be distant for some reason and then the correct information is restored, there may be an error that the locking/unlocking device 100 is unlocked without permission as it is recognized that the user returns home after going out even when the user has stayed at home. In this modification example, in order to prevent such a situation, control is performed to accurately determine the not-at-home state.

Figure 13:
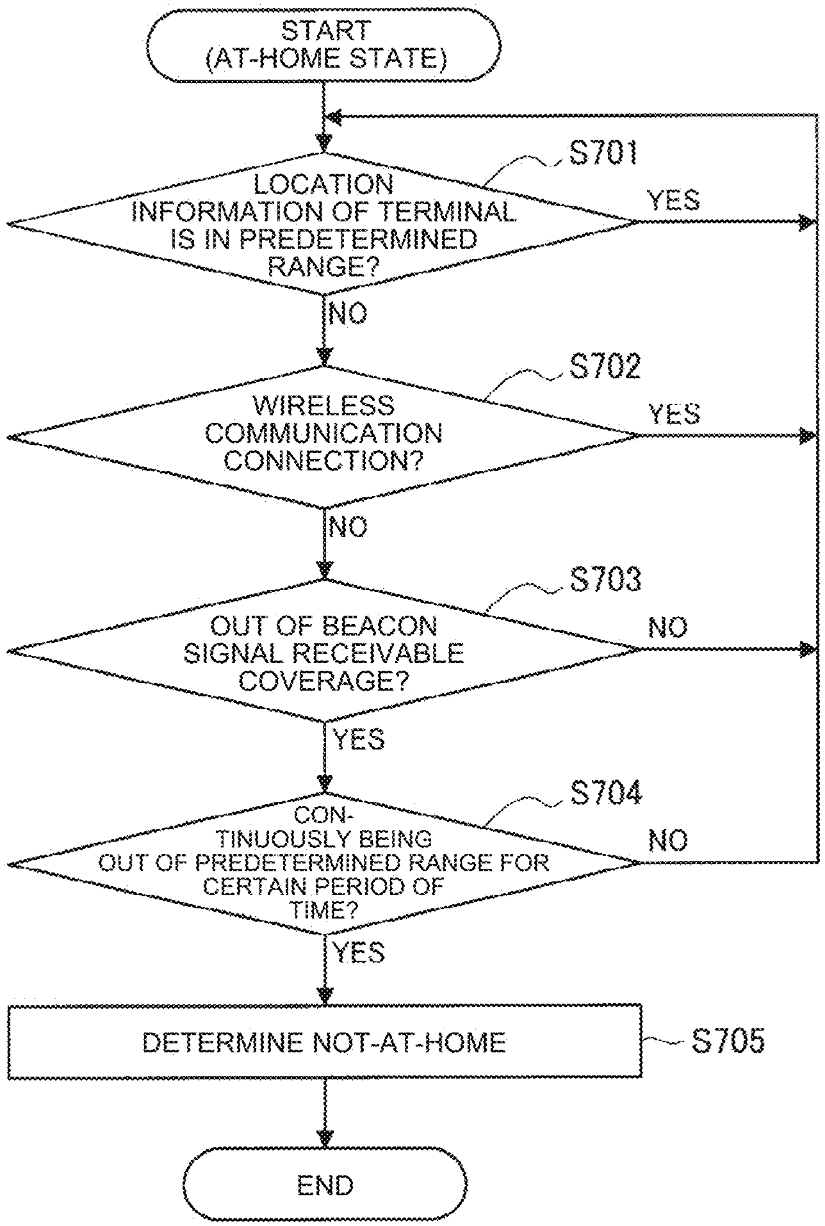
FIG. 13 is a view illustrating a flowchart according to a modification example of the same embodiment.

As illustrated in FIG. 13, starting from the at-home state, it is determined whether the location information of the communication terminal 300 is within a predetermined range (S701). If the location information is in the predetermined range, it is determined that the user is at home, and the process of step S701 is repeatedly executed. On the other hand, for example, if the location information of the communication terminal 300 is determined to be outside the predetermined range in step S701, it is subsequently determined whether the communication terminal 300 is connected to wireless communication such as Wi-Fi (S702). If there is a wireless communication connection, it is determined that the user is at home, and the process of step S701 is repeatedly executed. On the other hand, when there is no wireless communication connection, it is subsequently determined whether or not the beacon signal transmitted from the beacon transmission unit 170 of the locking/unlocking device 100 is out of the coverage area (S703). If the communication terminal 300 is in the beacon signal receivable range, it is determined that the user is in an at-home state and the process of step S701 is repeatedly executed. On the other hand, if the communication terminal 300 is out of the coverage area of the beacon signal, it is subsequently determined whether the communication terminal 300 has continuously been outside the predetermined range for a predetermined time (S704). When the communication terminal 300 does not exceed the predetermined range for a predetermined time, it is determined that the user is at home and the process of step S701 is repeatedly executed. On the other hand, if the communication terminal 300 has been outside the predetermined range for a predetermined time, it is determined that the user is not at home (S705).

By performing the not-at-home determination according to the above-described flowchart, the not-at-home determination can be accurately performed. In particular, it is possible to prevent the locking/unlocking device 100 from operating and the opening/closing device 200 is unlocked without permission even when the location information is mistakenly recognized by GPS.

Modification Example 2

Figure 14:
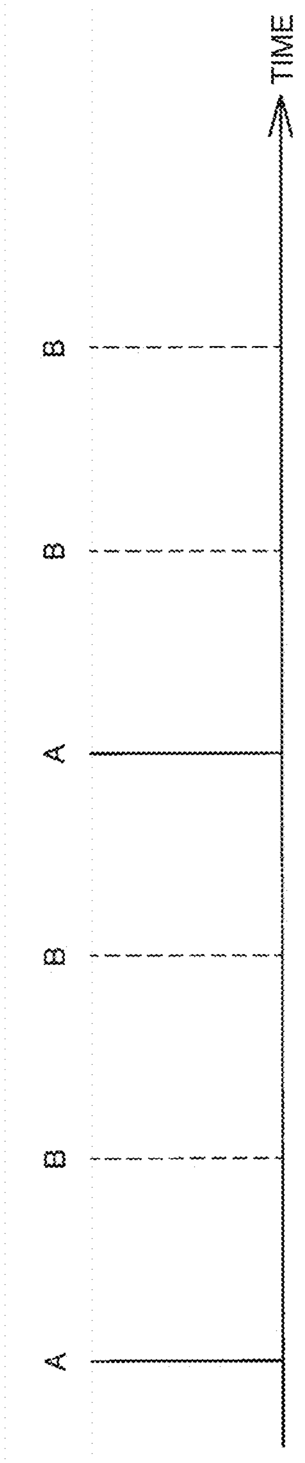
FIG. 14 is a diagram illustrating transmission timing of a beacon signal according to a modification example of the same embodiment.

Subsequently, a modification example of the present embodiment will be described with reference to FIG. 14. In this modification example, the transmission timing of the beacon signal transmitted from the beacon transmission unit 170 of the locking/unlocking device 100 is changed from a mode in which the beacon signal is transmitted once before or after the advertisement signal to a mode in which the beacon signal is transmitted multiple times. For example, as illustrated in FIG. 14, a beacon signal B may be transmitted twice after an advertisement signal A is transmitted once. This increases the possibility that the beacon signal B is detected by the communication terminal 300, and the control of the subsequent locking/unlocking operation can be started earlier. Therefore, the time the user waits for the activation of the locking/unlocking device 100 can be eliminated or shortened. Further, the number of times the beacon signal B is transmitted according to the present modification example is not limited to two times, and may be two times or more. Furthermore, in the present modification example, the beacon signal B is transmitted after the advertisement signal A is transmitted; however, it is sufficient if the number of times the beacon signal B is transmitted can be increased and the beacon signal B can be transmitted at an independent cycle, not limited to the timing before or after the transmission of the advertisement signal A.

Modification Example 3

Figure 15:
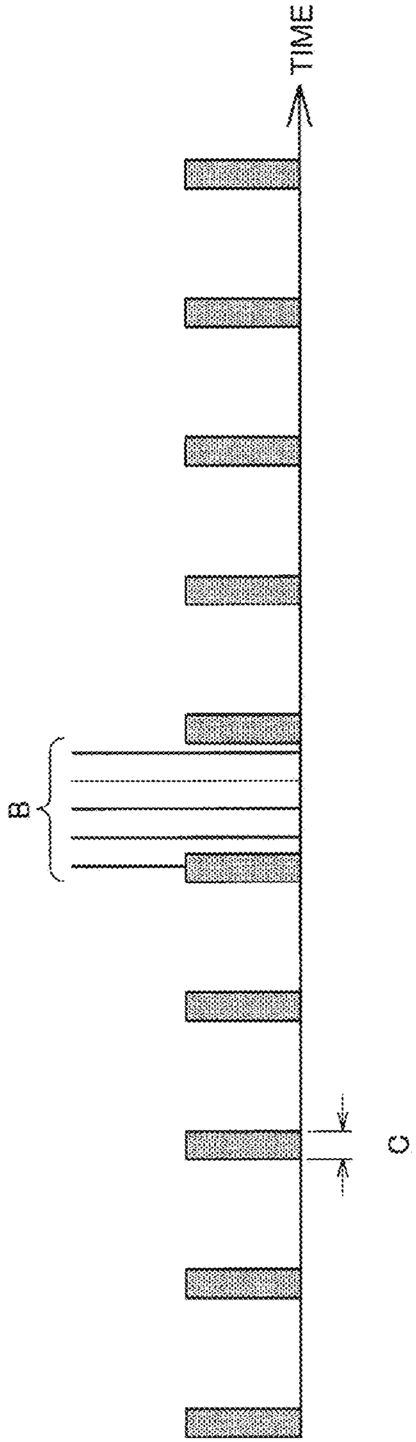
FIG. 15 is a diagram illustrating transmission timing of a beacon signal according to a modification example of the same embodiment.

Further, as another modification example of the present embodiment, for example, the transmission timing of the beacon signal transmitted from the beacon transmission unit 170 of the locking/unlocking device 100 is changed from a mode of transmitting the beacon signal once before or after the advertisement signal to a mode of transmitting the beacon signal intensively. In other words, the beacon signal B may be intensively transmitted at a predetermined cycle. For example, the beacon transmission unit 170 intensively transmits the beacon signal B at an interval longer than the scanning interval of communication terminal 300, while transmitting the beacon signal B evenly at a constant cycle. If the cycle of the beacon signal B of the communication terminal 300 does not match the cycle of the scanning interval C, the detection of the beacon signal B by the communication terminal 300 may be delayed. Therefore, as illustrated in FIG. 15, by intensively transmitting the beacon signal B according to the scanning interval C, the beacon signal B is reliably detected by the scan by the communication terminal 300, and the control of the locking/unlocking operation thereafter can be started earlier. Therefore, the time the user waits for the activation of the locking/unlocking device 100 can be eliminated or shortened. Further, since the timing of transmitting the beacon signal B is limited, the power consumption can be suppressed and the battery life can be extended.

Modification Example 4

Further, as another modification example of the present embodiment, the transmission interval of the beacon signal may be shortened when a predetermined condition is satisfied. As an example of the predetermined condition, there may be a case where the communication terminal 300 instructs the locking/unlocking device 100 to shorten the beacon signal transmission interval. As another condition, for example, there may be a case where the communication terminal 300 gives an instruction to shorten the transmission interval of the beacon signal when the communication terminal 300 approaches the opening/closing device 200. Further, as another condition, for example, there may be a case where a stationary communication terminal may instruct the locking/unlocking device 100 to shorten the transmission interval of the beacon signal via the Internet using the mobile communication terminal when the location information of a mobile communication terminal is acquired and the mobile communication terminal is approaching the opening/closing device 200.

In the present modification example, the transmission interval of the beacon signal is shortened to increase the possibility that the beacon signal is detected by the communication terminal 300, so that the subsequent control can be started earlier. Therefore, the time the user waits for the activation of the locking/unlocking device 100 can be eliminated or shortened. In addition, since the transmission interval of the beacon signal is shortened only when a predetermined condition is satisfied, the power consumption is suppressed and the battery life can be extended.

6. Sixth Embodiment

Figure 16:
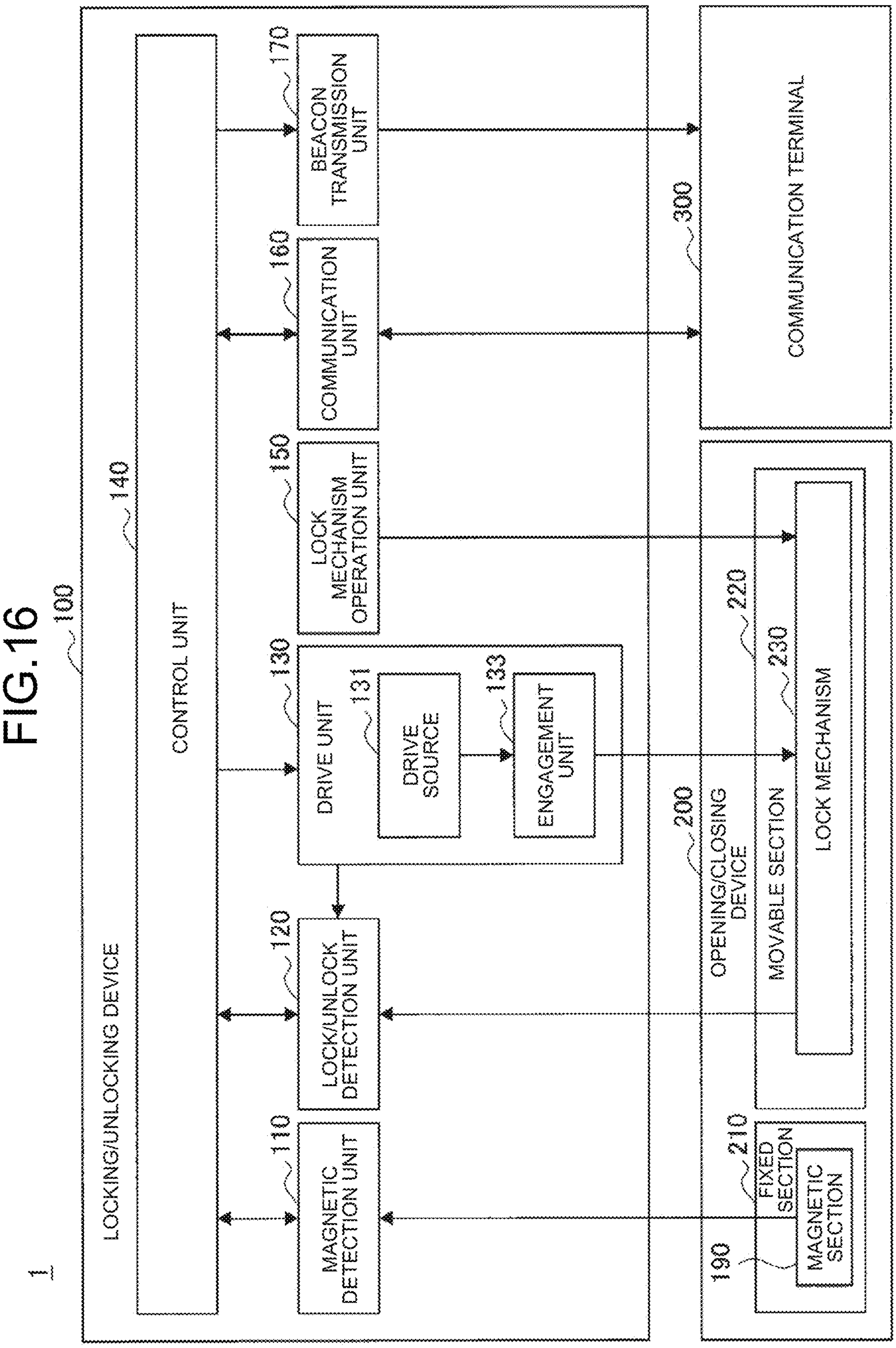
FIG. 16 is a block diagram illustrating an example of a configuration of a locking/unlocking device according to a sixth embodiment of the present disclosure.

With reference to FIG. 16, a schematic configuration of the locking/unlocking device 100 according to the sixth embodiment of the present disclosure will be described. Note that the same components and controls as those of the other embodiments are designated by the same reference numerals and the description thereof will be omitted. As illustrated in FIG. 16, in the opening/closing device 200 to which the locking/unlocking device 100 according to the present embodiment is attached, the magnetic section 190 is attached to the fixed section 210. Other configurations are similar to those in FIG. 9.

The magnetic section 190 is at least partially made of a magnetic material, and is attached to the fixed section 210 of the opening/closing device 200. The magnetic section 190 may be, for example, a permanent magnet having a surface magnetic flux density of 200 mT or less. When the value of the surface magnetic flux density is increased, it becomes easier for the magnetic detection unit 110 to detect a change in the magnetic field; however, when the value of the surface magnetic flux density becomes too high, the upper limit of the value that can be detected by the magnetic detection unit 110 may be exceeded. Therefore, the value of the surface magnetic flux density of the magnetic section 190 can be set to the above value.

By attaching the magnetic section 190 to the opening/closing device 200, the change in the magnetic field detected by the magnetic detection unit 110 can be detected more accurately. Further, even when the fixed section 210 of the opening/closing device 200 is made of a non-magnetic material such as wood or glass, the magnetic detection unit 110 can detect a change in the magnetic field.

Figure 17A:
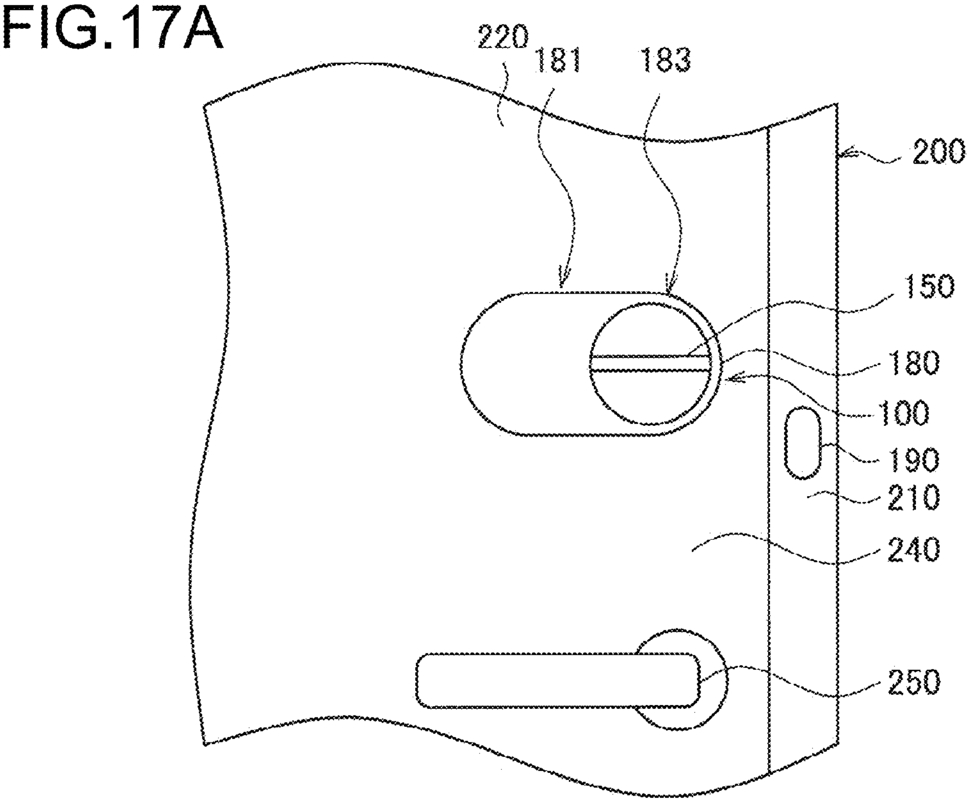
FIG. 17A is a diagram illustrating an example of an attached state of the locking/unlocking device according to the same embodiment.
Figure 17B:
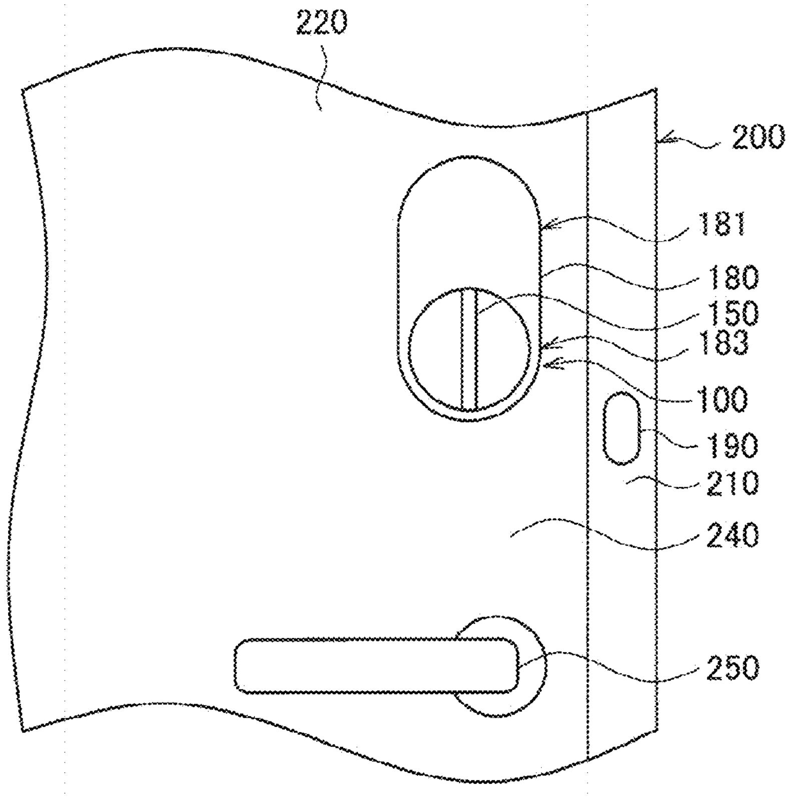
FIG. 17B is a diagram illustrating an example of an attached state of the locking/unlocking device according to the same embodiment.
Figure 17C:
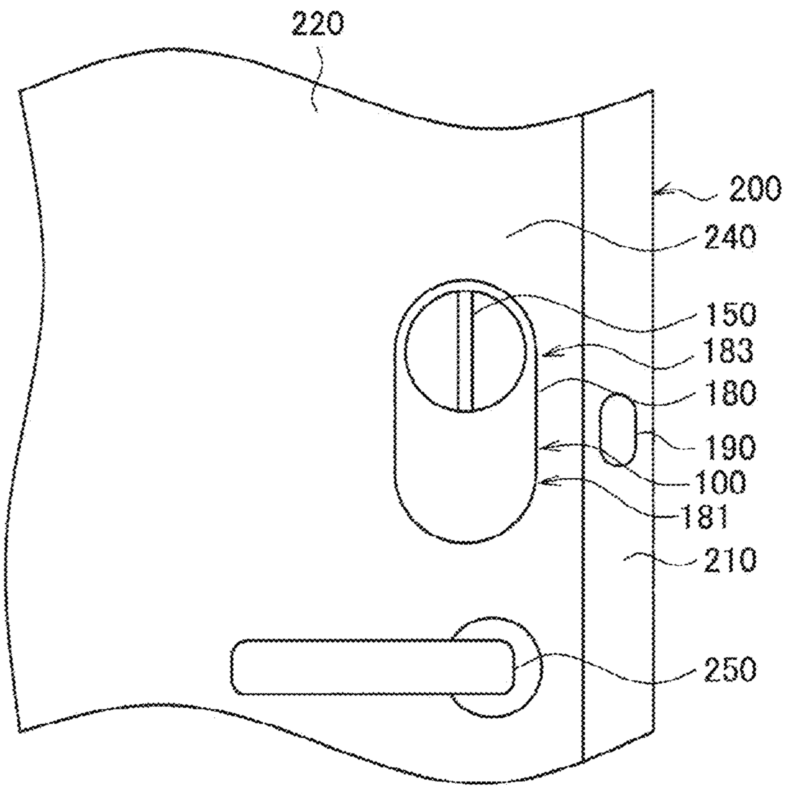
FIG. 17C is a diagram illustrating an example of an attached state of the locking/unlocking device according to the embodiment.

The locking/unlocking device 100 according to the present embodiment may be attached to the opening/closing device 200 including a door (movable section 220) and a door frame (fixed section 210) as illustrated in FIGS. 17A to 17C, for example. For example, as illustrated in FIG. 17A, the locking/unlocking device 100 according to the present embodiment may be attached to the opening/closing device 200 such that the oval shape of the housing unit 180 is horizontally placed in the front view after attachment. In other words, the locking/unlocking device 100 may be attached so that the second portion 183 of the housing unit 180 is placed closer to the magnetic section 190, compared to the first portion 181. The magnetic detection unit 110 is provided on the end portion side of the second portion 183 of the housing unit 180, which is opposite to the first portion 181. By mounting the locking/unlocking device 100 in this manner, the distance between the magnetic detection unit 110 and the magnetic section 190 becomes the shortest. Therefore, the accuracy with which the magnetic detection unit 110 detects a change in the magnetic field can be improved.

Further, as illustrated in FIGS. 17B and 17C, for example, the locking/unlocking device 100 according to the present embodiment may be attached to the movable section 220 of the opening/closing device 200 such that the oval shape of the housing unit 180 is vertically placed in the front view. In other words, the locking/unlocking device 100 is provided so that the second portion 183 of the housing unit 180 is placed in the movable section 220 in the state of being separated from the magnetic section 190 by the same distance as the first portion 181. In this manner, the locking/unlocking device 100 may be attached such that the longitudinal direction thereof is substantially parallel to the portion of the fixed section 210 extending in the vertical direction. Also in this case, since the position of the second portion 183 can be set to a position close to the magnetic section 190, the distance between the magnetic detection unit 110 and the magnetic section 190 can be shortened.

In addition, in FIGS. 17B and 17C, the directions in which the locking/unlocking device 100 is attached are opposite to each other by 180°. In other words, in FIGS. 17B and 17C, with the locking/unlocking device 100 attached, the position of the first portion 181 is symmetrical with respect to the second portion 183. However, the distance between the second portion 183 of the housing unit 180 and the magnetic section 190 does not change. Therefore, even when the mounting direction of the locking/unlocking device 100 is changed, the magnetic detection unit 110 comes close to the magnetic section 190, so that the detection accuracy of the magnetic detection unit 110 can be improved regardless of the mounting state.

The preferred embodiments of the present disclosure have been described above in detail with reference to the accompanying drawings, but the technical scope of the present disclosure is not limited to such examples. It is obvious that a person having ordinary knowledge in the technical field of the present disclosure can come up with various changes or modifications within the scope of the technical idea described in the claims. It is understood that the changes or modifications also naturally belong to the technical scope of the present disclosure.

Further, the effects described in the present specification are merely explanatory or exemplifying ones, and are not limiting. In other words, the technique according to the present disclosure may have other effects that are apparent to those skilled in the art from the description of the present specification, in addition to or instead of the above effects.

The following configurations also belong to the technical scope of the present disclosure.

(1)

A locking/unlocking device comprising:

a drive unit configured to drive a lock mechanism of an opening/closing device;

a magnetic detection unit configured to detect a change in a magnetic field based on a change in a relative position between a movable section and a fixed section of the opening/closing device; and a control unit configured to determine an open/closed state of the opening/closing device on a basis of the change in the magnetic field detected by the magnetic detection unit and activate the drive unit to lock or unlock the lock mechanism on a basis of the open/closed state.

(2)

The locking/unlocking device according to (1), wherein the control unit activates the drive unit to drive the lock mechanism until the lock mechanism is in a locked state when it is determined that the opening/closing device is in a closed state after determining that the opening/closing device is in an open state.

(3)

The locking/unlocking device according to (1) or (2), wherein the control unit determines that the opening/closing device is in a closed state when the change in the magnetic field detected by the magnetic detection unit is less than a threshold value, and determines that the opening/closing device is in an open state when the change is equal to or greater than the threshold value.

(4)

The locking/unlocking device according to any one of (1) to (3), wherein the magnetic detection unit notifies the control unit of a detection result at a predetermined output cycle.

(5)

The locking/unlocking device according to (4), wherein the control unit changes the output cycle of the magnetic detection unit based on the open/closed state of the opening/closing device.

(6)

The locking/unlocking device according to (4) or (5), wherein the output cycle of the magnetic detection unit after the opening/closing device is shifted from a closed state to an open state is shorter than the output cycle of the magnetic detection unit while the opening/closing device is in the closed state.

(7)

The locking/unlocking device according to any one of (1) to (6), further comprising a lock/unlock detection unit configured to detect a locked/unlocked state of the opening/closing device, wherein the control unit determines the locked/unlocked state of the opening/closing device on a basis of a detection result of the lock/unlock detection unit and activates the magnetic detection unit when the opening/closing device is in an unlocked state.

(8)

The locking/unlocking device according to (7), wherein the control unit activates the magnetic detection unit when the opening/closing device is in the unlocked state and obtains the detection result from the magnetic detection unit.

(9)

The locking/unlocking device according to (7) or (8), wherein the magnetic detection unit notifies the control unit of the detection result at the predetermined output cycle, and the output cycle when the opening/closing device is in the unlocked state is shorter than the output cycle when the opening/closing device is in a locked state.

(10)

The locking/unlocking device according to any one of (1) to (9), wherein the control unit stops the magnetic detection unit when it is determined that the opening/closing device is shifted from a closed state, an open state, and then to the closed state in order based on a detection result by the magnetic detection unit.

(11)

The locking/unlocking device according to (10), wherein the control unit activates the drive unit to drive the lock mechanism until the lock mechanism is in a locked state when the magnetic detection unit is stopped.

(12)

The locking/unlocking device according to any one of (1) to (11), further comprising a communication unit configured to receive a signal from a communication terminal, wherein the control unit activates the magnetic detection unit when the communication unit receives a signal from the communication terminal.

(13)

The locking/unlocking device according to (12), further comprising a beacon transmission unit configured to transmit a beacon signal that can be detected by the communication terminal, wherein the communication unit includes a transmission unit that transmits a connection start signal for performing wireless communication connection with the communication terminal and a reception unit that receives a signal from the communication terminal.

(14)

The locking/unlocking device according to (13), wherein the beacon transmission unit transmits the beacon signal at intervals longer than intervals of scanning the beacon signal by the communication terminal.

(15)

The locking/unlocking device according to any one of (1) to (14), further comprising a lock/unlock detection unit configured to detect a locked/unlocked state of the opening/closing device, wherein the control unit performs an automatic lock control, and the lock/unlock detection unit stops the automatic lock control when it is determined that the lock mechanism is in an unlocked state multiple times within a predetermined period of time.

(16)

The locking/unlocking device according to any one of (1) to (15), further comprising a housing unit that accommodates the drive unit, the magnetic detection unit, and the control unit, wherein in the housing unit, the magnetic detection unit is provided on a side opposite to the drive unit.

(17)

The locking/unlocking device according to (16), wherein the lock mechanism includes a thumb turn, the drive unit includes a thumb turn holder that holds the thumb turn, and a drive source that rotates the thumb turn holder, and in the housing unit, the magnetic detection unit is provided on a side opposite to the drive source with respect to a rotation center axis of the thumb turn holder.

(18)

The locking/unlocking device according to any one of (1) to (17), further comprising a magnetic section configured to be attached to the fixed section, wherein the magnetic detection unit detects the change in the magnetic field based on a change in the relative position between the movable section and the fixed section to which the magnetic section is attached.

(19)

The locking/unlocking device according to any one of (1) to (18), wherein the locking/unlocking device is detachably attached to the opening/closing device.

(20)

A locking/unlocking method comprising:

determining an open/closed state of an opening/closing device on a basis of a change in a magnetic field based on a change in the relative position between a movable section and a fixed section of the opening/closing device, which is detected by a magnetic detection unit; and activating a drive unit on a basis of the open/closed state of the opening/closing device to drive a lock mechanism of the opening/closing device.

(21)

A locking/unlocking system comprising:

a drive unit configured to drive a lock mechanism of an opening/closing device;

a magnetic detection unit configured to detect a change in a magnetic field based on a change in a relative position between a movable section and a fixed section of the opening/closing device;

a control unit configured to determine an open/closed state of the opening/closing device on a basis of the change in the magnetic field detected by the magnetic detection unit and activate the drive unit on a basis of the open/closed state of the opening/closing device to lock or unlock the lock mechanism;

a locking/unlocking device including a communication unit; and a communication terminal, wherein the locking/unlocking device activates the magnetic detection unit when the communication unit receives a signal from the communication terminal.

REFERENCE SIGNS LIST

1 LOCKING/UNLOCKING SYSTEM
100 LOCKING/UNLOCKING DEVICE
110 MAGNETIC DETECTION UNIT
120 LOCK/UNLOCK DETECTION UNIT
130 DRIVE UNIT
131 DRIVE SOURCE
133 ENGAGEMENT UNIT
140 CONTROL UNIT
150 LOCK MECHANISM OPERATION UNIT
160 COMMUNICATIONS UNIT
170 BEACON TRANSMISSION UNIT
180 HOUSING UNIT
190 MAGNETIC SECTION
200 OPENING/CLOSING DEVICE
210 FIXED SECTION (DOOR FRAME)
220 MOVABLE SECTION (DOOR)
230 LOCK MECHANISM
300 COMMUNICATION TERMINAL

The invention claimed is:

1. A locking/unlocking device comprising:

a drive unit, including at least one of an actuator and a motor, configured to drive a lock mechanism of an opening/closing device;

a magnetic detection sensor configured to detect a change in a magnetic field based on a change in a relative position between a movable section and a fixed section of the opening/closing device;

control circuitry configured to determine an open/closed state of the opening/closing device on the basis of the change in the magnetic field detected by the magnetic detection sensor, and to activate the drive unit to lock or unlock the lock mechanism on the basis of the open/closed state; and a lock/unlock detection sensor configured to detect a locked/unlocked state of the lock mechanism of the opening/closing device, wherein the control circuitry is further configured to determine the locked/unlocked state of the lock mechanism of the opening/closing device on the basis of a detection result of the lock/unlock detection sensor, and to activate the magnetic detection sensor under a condition the lock mechanism of the opening/closing device is in the unlocked state;

the magnetic detection sensor is further configured to notify the control circuitry of a detection result at a predetermined output cycle; and the predetermined output cycle is shorter under a condition the lock mechanism is in the unlocked state than under another condition the lock mechanism is in the locked state.

2. The locking/unlocking device according to claim 1, wherein the control circuitry is further configured to activate the drive unit to drive the lock mechanism until the lock mechanism is in the locked state under a condition it is determined that the opening/closing device is in the closed state after determining that the opening/closing device is in the open state.

3. The locking/unlocking device according to claim 1, wherein the control circuitry is further configured to determine that the opening/closing device is in the closed state under a condition the change in the magnetic field detected by the magnetic detection sensor is less than a threshold value, and to determine that the opening/closing device is in the open state under another condition the change is equal to or greater than the threshold value.

4. The locking/unlocking device according to claim 1, wherein the control circuitry is further configured to change the predetermined output cycle for notification by the magnetic detection sensor based on the open/closed state of the opening/closing device.

5. The locking/unlocking device according to claim 4, wherein the predetermined output cycle for the notification by the magnetic detection sensor is shorter under a condition the opening/closing device is shifted from the closed state to the open state than under another condition the opening/closing device is in the closed state.

6. The locking/unlocking device according to claim 1, wherein the control circuitry is further configured to activate the magnetic detection sensor under a condition the lock mechanism of the opening/closing device is in the unlocked state and to obtain the detection result from the magnetic detection sensor.

7. The locking/unlocking device according to claim 1, wherein the control circuitry is further configured to deactivate the magnetic detection sensor under a condition it is determined that the opening/closing device is shifted from the closed state to the open state, and then to the closed state in order based on the detection result by the magnetic detection sensor.

8. The locking/unlocking device according to claim 7, wherein the control circuitry is further configured to activate the drive unit to drive the lock mechanism until the lock mechanism is in the locked state under a condition the magnetic detection sensor is deactivated.

9. The locking/unlocking device according to claim 1, further comprising:

communication circuitry configured to receive a signal from a communication terminal, wherein the control circuitry is further configured to activate the magnetic detection sensor under a condition the communication circuitry receives the signal from the communication terminal.

10. The locking/unlocking device according to claim 9, further comprising:

beacon transmission circuitry configured to transmit a beacon signal that is detected by the communication terminal, wherein the communication circuitry includes transmission circuitry configured to transmit a connection start signal for performing wireless communication connection with the communication terminal and reception circuitry configured to receive the signal from the communication terminal.

11. The locking/unlocking device according to claim 10, wherein the beacon transmission circuitry is further configured to transmit the beacon signal at intervals longer than intervals of scanning the beacon signal by the communication terminal.

12. The locking/unlocking device according to claim 1, further comprising:

a housing that accommodates the drive unit, the magnetic detection sensor, and the control circuitry, wherein in the housing, the magnetic detection sensor is provided on a side opposite to the drive unit.

13. The locking/unlocking device according to claim 1, further comprising:

a magnetic section configured to be attached to the fixed section, wherein the magnetic detection sensor is further configured to detect the change in the magnetic field based on the change in the relative position between the movable section and the fixed section to which the magnetic section is attached.

14. The locking/unlocking, device according to claim 1, wherein the locking/unlocking device is detachably attached to the opening/closing device.

15. A locking/unlocking device comprising:

a drive unit, including at least one of an actuator and a motor, configured to drive a lock mechanism of an opening/closing device;

a magnetic detection sensor configured to detect a change in a magnetic field based on a change in a relative position between a movable section and a fixed section of the opening/closing device;

control circuitry configured to determine an open/closed state of the opening/closing device on the basis of the change in the magnetic field detected by the magnetic detection sensor, and to activate the drive unit to lock or unlock the lock mechanism on the basis of the open/closed state; and a lock/unlock detection sensor configured to detect a locked/unlocked state of the lock mechanism of the opening/closing device, wherein the control circuitry is further configured to perform an automatic lock control, and the lock/unlock detection sensor is further configured to deactivate the automatic lock control under a condition it is determined that the lock mechanism is in the unlocked state multiple times within a predetermined period of time.

16. A locking/unlocking device comprising:

a drive unit, including at least one of an actuator and a motor as a drive source, configured to drive a lock mechanism of an opening/closing device;

a magnetic detection sensor configured to detect a change in a magnetic field based on a change in a relative position between a movable section and a fixed section of the open/closing device;

control circuitry configured to determine an open/closed state of the opening/closing device on the basis of the change in the magnetic field detected by the magnetic detection sensor, and to activate the drive unit to lock or unlock the lock mechanism on the basis of the open/closed state; and a housing that accommodates the drive unit, the magnetic detection sensor, and the control circuitry, wherein the lock mechanism includes a thumb turn, the drive unit further includes a thumb turn holder that holds the thumb turn, the drive source of the drive unit rotates the thumb turn holder, and in the housing, the magnetic detection sensor is provided on a side opposite to the drive source with respect to a rotation center axis of the thumb turn holder.

* * * * *